(12) United States Patent
Tabata et al.

(10) Patent No.: US 8,224,535 B2
(45) Date of Patent: Jul. 17, 2012

(54) CONTROL APPARATUS AND CONTROL METHOD FOR VEHICULAR POWER TRANSMITTING APPARATUS

(75) Inventors: Atsushi Tabata, Okazaki (JP); Tooru Matsubara, Toyota (JP); Hiroyuki Shibata, Toyota (JP); Kenta Kumazaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1192 days.

(21) Appl. No.: 12/068,827

(22) Filed: Feb. 12, 2008

(65) Prior Publication Data
US 2008/0195286 A1  Aug. 14, 2008

(30) Foreign Application Priority Data

Feb. 14, 2007 (JP) ................................. 2007-034157

(51) Int. Cl.
G06F 7/00 (2006.01)
G06F 17/00 (2006.01)
G06F 19/00 (2011.01)
(52) U.S. Cl. .............................. 701/51; 701/55; 701/56
(58) Field of Classification Search .................. None
See application file for complete search history.

(56) References Cited

U.S. PATENT DOCUMENTS 7,749,131 B2 * 7/2010 Imamura et al. ................. 477/3
8,036,801 B2 * 10/2011 Tabata et al. .................. 701/55

FOREIGN PATENT DOCUMENTS

| JP | A 2005-206136 | 8/2005 |
| JP | A 2006-17189 | 1/2006 |
| JP | A-2006-064153 | 3/2006 |
| JP | A-2007-001389 | 1/2007 |
| WO | WO 2006/104253 A1 | 10/2006 |

OTHER PUBLICATIONS

Office Action issued by Japanese Patent Office in Application No. 2007-034157 dated Apr. 1, 2011 (with translation).

* cited by examiner

*Primary Examiner* — Thomas Tarcza
*Assistant Examiner* — Nagi Murshed
(74) *Attorney, Agent, or Firm* — Oliff & Berridge, PLC

(57) ABSTRACT

A control apparatus for a vehicular power transmitting apparatus includes, in series, i) a differential portion which is provided with a differential mechanism having a differential function with respect to an input shaft and an output shaft, in which the differential mechanism is switched between a differential state and a non-differential state, and ii) a stepped shifting portion that shifts between a plurality of gears in a stepped manner. During a shift with a switch between the differential state and the non-differential state in the differential portion, the control apparatus either maintains the gear at that time or shifts into a gear that is adjacent to that gear.

24 Claims, 12 Drawing Sheets

|  | C0 | C1 | C2 | C3 | B0 | B1 | B2 | SPEED RATIO | STEP |
|---|---|---|---|---|---|---|---|---|---|
| 1st | ◎ | ○ |  |  |  |  | ○ | 3.683 | 1.380 |
| 2nd |  | ○ |  |  | ◎ |  | ○ | 2.669 | 1.398 |
| 3rd | ◎ | ○ |  |  |  | ○ |  | 1.909 | 1.380 |
| 4th |  | ○ |  |  | ◎ | ○ |  | 1.383 | 1.383 |
| 5th | ◎ | ○ |  | ○ |  |  |  | 1.000 | 1.383 |
| 6th | ◎ |  |  | ○ |  |  |  | 0.661 | 1.380 |
| 7th |  |  |  | ○ | ◎ | ○ |  | 0.479 | TOTAL SPEED RATIO WIDTH 7.687 |
| R(ENGINE) |  |  | ○ |  |  | ○ | ○ |  |  |
| R(MOTOR) |  | ○ |  |  |  |  | ○ |  |  |
| N |  |  |  |  |  |  | ○ |  |  |

○ APPLIED  ◎ APPLIED WHEN STEPPED, RELEASED WHEN CONTINUOUSLY VARIABLE

| | C0 | C1 | C2 | B0 | B1 | B2 | B3 | SPEED RATIO | STEP |
|---|---|---|---|---|---|---|---|---|---|
| 1st | ◎ | ○ | | | ○ | | | 4.241 | 1.420 |
| 2nd | | ○ | | ◎ | ○ | | | 2.986 | 1.415 |
| 3rd | ◎ | | ○ | | ○ | | | 2.111 | 1.420 |
| 4th | | ○ | | ◎ | ○ | | | 1.482 | 1.487 |
| 5th | ◎ | ○ | ○ | | | | | 1.000 | 1.522 |
| 6th | ◎ | | ○ | | | ○ | | 0.657 | 1.420 |
| 7th | | ○ | | ◎ | | ○ | | 0.463 | TOTAL SPEED RATIO WIDTH |
| R(ENGINE) | ○ | | | | | | ○ | | |
| R(MOTOR) | ○ | | | | ○ | | | | |
| N | ○ | | | | | | | | 9.164 |

○ APPLIED ◎ APPLIED WHEN STEPPED, RELEASED WHEN CONTINUOUSLY VARIABLE

CONTROL APPARATUS AND CONTROL METHOD FOR VEHICULAR POWER TRANSMITTING APPARATUS

INCORPORATION BY REFERENCE

The disclosure of Japanese Patent Application No. 2007-034157 filed on Feb. 14, 2007, including the specification, drawings and abstract is incorporated herein by reference in its entirety.

BACKGROUND OF THE INVENTION

1. Field of the Invention

The invention relates to a vehicular power transmitting apparatus provided with a continuously variable shifting portion and a stepped shifting portion. More particularly, the invention relates to technology that is able to obtain a close ratio in which the change width of speed ratios is large (i.e., spans over a wide range) and in which the speed ratios are close together when the gear (i.e., gear speed) is changed in a stepped manner, while minimizing an increase in overall size of the vehicular power transmitting apparatus.

2. Description of the Related Art

Japanese Patent Application Publication No. 2005-206136 (JP-A-2005-206136) describes a vehicular power transmitting apparatus in which a power split device that distributes output from an engine to a first electric motor and a transmitting member is selectively switched between a state in which it can operate as an electrical continuously variable transmission and a state in which it can operate as a two-speed transmission. In this kind of vehicular power transmitting apparatus, a stepped shifting mechanism is provided in addition to a second electric motor, between the transmitting member and the output member. This stepped shifting mechanism changes the rotation speed of the transmitting member, i.e., changes the rotation speed of an input member into which output from the engine is input, into one of a plurality of gears and then outputs that rotation.

When the power transmitting apparatus is operated as a stepped automatic transmission, a close ratio in which the speed ratio change width is wide (i.e., spans over a wide range) and the speed ratios are close together is desirable. With respect to this, in JP-A-2005-206136, the power transmitting apparatus has a second transmitting path that directly transmits the rotation of the input member to the stepped shifting mechanism such that seven gears can be established, as shown in FIGS. 17 to 20 of that document, for example. However, increasing the number of power transmitting paths in this way resulted in an increase in the overall dimensions of the power transmitting apparatus, which is undesirable.

SUMMARY OF THE INVENTION

This invention thus provides a control apparatus and a control method for a vehicular power transmitting apparatus which is able to obtain a wide range in which the change width of speed ratios is large and a close ratio in which the speed ratios are close together when the gear is changed in a stepped manner, while minimizing an increase in overall size of the vehicular power transmitting apparatus.

A first aspect of the invention relates to a control apparatus for a vehicular power transmitting apparatus that includes, in series, i) a differential portion which is provided with a differential mechanism having a differential function with respect to an input shaft and an output shaft, in which the differential mechanism is switched between a differential state and a non-differential state, and ii) a stepped shifting portion that shifts between a plurality of gears in a stepped manner. During a shift with a switch between the differential state and the non-differential state in the differential portion, the control apparatus maintains the gear at that time or shifts into a gear that is adjacent to that gear.

Also, in the control apparatus, the differential portion may switch between a plurality of the non-differential states, each of which has a different speed ratio. Further, the vehicular power transmitting apparatus, when the differential portion has been placed in a non-differential state selected from among the plurality of non-differential states, may operate as a stepped transmission in which a plurality of various total speed ratios of the vehicular power transmitting apparatus are selectively established based on a speed ratio of the gear set by the stepped shifting portion and a speed ratio of the differential portion in the non-differential state. In addition, the control apparatus may execute a shift in which the total speed ratio is changed by the switch between the plurality of non-differential states in the differential portion and the shift in the stepped shifting portion being executed simultaneously.

Also, a second aspect of the invention relates to a control apparatus for a vehicular power transmitting apparatus that includes, in series, i) a differential portion which is provided with a differential mechanism having a differential function with respect to an input shaft and an output shaft, in which the differential mechanism is switched between a differential state and a non-differential state, and ii) a stepped shifting portion that shifts between a plurality of gears in a stepped manner. The control apparatus makes a) the order of gears into which the stepped shifting portion is shifted as the vehicle speed changes when the differential portion is in the non-differential state, and b) the order of gears into which the stepped shifting portion is shifted as the vehicle speed changes when the differential portion is in the differential state, the same.

Also, a third aspect of the invention relates to a control apparatus for a vehicular power transmitting apparatus that includes, in series, i) a differential portion which is provided with a differential mechanism having a differential function with respect to an input shaft and an output shaft, in which the differential mechanism is switched between a differential state and a non-differential state, and ii) a stepped shifting portion that shifts between a plurality of gears in a stepped manner. The differential portion switches between a plurality of the non-differential states, each of which has a different speed ratio, and the control apparatus sets a shift point vehicle speed for changing the total speed ratio by the switch between different non-differential states in the differential portion and the shift in the stepped shifting portion being executed simultaneously, within a vehicle speed range that is set such that a vehicle runs using a combination of the stepped shifting portion that uses the same gear as the higher gear, from among the gear before the shift in the stepped shifting portion and the gear after the shift in the stepped shifting portion, and the differential portion that has been placed in the differential state.

Also, in the foregoing control apparatus, the differential portion may switch between a plurality of the non-differential states, each of which has a different speed ratio. Further, a shift point vehicle speed for changing the total speed ratio by the switch between different non-differential states in the differential portion and the shift in the stepped shifting portion being executed simultaneously may be set within a vehicle speed range that is set such that a vehicle runs using a combination of the stepped shifting portion that uses the same gear as the higher gear, from among the gear before the shift in the stepped shifting portion and the gear after the shift in the stepped shifting portion, and the differential portion that has been placed in the differential state.

Also, the control apparatus according to the first aspect may maintain the same gear in the stepped shifting portion regardless of a switch between the differential state and the non-differential state in the differential portion when a command has been output to the vehicular power transmitting apparatus to change one of output and output torque.

Also, the control apparatus according to the first aspect may switch the differential portion between the differential state and the non-differential state, or simultaneously execute a shift in the stepped shifting portion and switch the differential portion between the differential state and the non-differential state, so that the speed of an engine that supplies driving force to a vehicle via the vehicular power transmitting apparatus does not decrease when a command to increase one of output and output torque has been output to the vehicular power transmitting apparatus.

Also, the control apparatus according to the first aspect may switch the differential portion between the differential state and the non-differential state, or simultaneously execute a shift in the stepped shifting portion and switch the differential portion between the differential state and the non-differential state, so that the speed of an engine that supplies driving force to a vehicle via the vehicular power transmitting apparatus does not increase when a command to reduce one of output and output torque has been output to the vehicular power transmitting apparatus.

Also, in the control apparatus according to the first aspect, the differential portion may operate as an electric continuously variable transmission that controls the differential state of the input shaft rotation speed and the output shaft rotation speed by the operating state of an electric motor that is connected to a rotating element of the differential mechanism being controlled when the differential portion is in the differential state. Further, the vehicular power transmitting apparatus may operate as a continuously variable transmission that continuously changes the total speed ratio using the stepped shifting portion and the differential portion which has been placed in the differential state in combination.

A fourth aspect of the invention relates to a control apparatus for a vehicular power transmitting apparatus that includes, in series, i) a differential portion which is provided with a differential mechanism having a differential function with respect to an input shaft and an output shaft, in which the differential mechanism is switched between a differential state and a non-differential state, and ii) a stepped shifting portion that shifts between a plurality of gears in a stepped manner. This control apparatus includes i) a first control map in which a differential region that places the differential portion in the differential state and a non-differential region that places the differential portion in the non-differential state are determined by a switching line according to a predetermined control parameter, and which is used for switching control to switch the differential portion between the differential state and the non-differential state, ii) a second control map in which a continuously variable shift line that specifies a change of the gear of the stepped shifting portion is determined by the same control parameter as the control parameter in the first control map, and which is used in shift control of the vehicular power transmitting apparatus when the differential portion is in the differential state, and iii) a third control map in which a stepped shift line that specifies a switch between the plurality of non-differential states in the differential portion and/or a change of the gear of the stepped shifting portion, is determined by the same control parameter as the control parameter in the first control map, and which is used in shift control of the vehicular power transmitting apparatus. Further, when the first control map, the second control map, and the third control map are superposed on one another, the control apparatus makes the gear of the stepped shifting portion that is used in a predetermined continuously variable gear region which is defined by being sandwiched between a pair of continuously variable shift lines in the differential region and the switching line, either the same as the gear of the stepped shifting portion that is used in a predetermined stepped gear region which is defined by being sandwiched between a pair of stepped shift lines in the non-differential region and the switching line, or a gear that is adjacent to the gear of the stepped shifting portion that is used in the predetermined stepped gear region which is defined by being sandwiched between the pair of stepped shift lines in the non-differential region and the switching line.

Also, the stepped shift line in the third control map may include a portion for executing the switch between the plurality of non-differential states and the shift in the stepped shifting portion substantially simultaneously.

Also, the point of intersection of a switching line in the first control map and a stepped shift line that is associated with both a shift in the stepped shifting portion and a switch among the plurality of non-differential states in the differential portion, from among the plurality of stepped shift lines in the third control map, may be positioned between i) a point of intersection of a switching line in the first control map and a first continuously variable shift line that represents a shift between a) a predetermined gear which is the higher gear, from among the gear before the shift in the stepped shifting portion and the gear after the shift in the stepped shifting portion, according to the stepped shift line with both the shift in the stepped shifting portion and the switch among the plurality of non-differential states in the differential portion, among the plurality of continuously variable shift lines in the second map, and b) a gear that is adjacent to, on the lower gear side of, that predetermined gear, and ii) a point of intersection of a switching line in the first control map and a second continuously variable shift line that represents a shift between the predetermined gear and a gear that is adjacent to, on the higher gear side of, that predetermined gear.

Also, the continuously variable shift line in the second control map may determine only the gear of the stepped shifting portion.

Also, when the first control map, the second control map, and the third control map are superposed on one another, the gear used in the stepped shifting portion in the continuously variable gear region may either be the same as the gear used in the stepped shifting portion in a predetermined stepped gear region that is contacting the continuously variable gear region via the switching line, or a gear that is adjacent to the gear used in the stepped shifting portion in the predetermined stepped gear region that is contacting the continuously variable gear region via the switching line.

A fifth aspect of the invention relates to a control method for a vehicular power transmitting apparatus that includes, in series, i) a differential portion which is provided with a differential mechanism having a differential function with respect to an input shaft and an output shaft, in which the differential mechanism is switched between a differential state and a non-differential state, and ii) a stepped shifting portion that shifts between a plurality of gears in a stepped manner. This control method includes maintaining, during a shift with a switch between the differential state and the non-differential state in the differential portion, the gear at that time or shifting into a gear that is adjacent to that gear.

As described above, according to the control apparatus of the first aspect, during a shift with a switch between the differential state and the non-differential state in the differential portion, the stepped shifting portion either maintains the gear at that time or shifts into a gear that is adjacent to that gear. Accordingly, during a shift with a switch between the differential state and the non-differential state in the differential portion, a shift in which the gear is changed by two or more gears is not executed in the stepped shifting portion, thus enabling shift shock to be suppressed. Generally in the related art, when the differential portion switches between the differential state and the non-differential state, the gear in the stepped shifting portion is not changed. Instead, the stepped shifting portion is kept in the gear that it was in before the state of the differential portion was switched. According to this first aspect, however, the stepped shifting portion can be shifted into an adjacent gear at the same time the differential portion switches between the differential state and the non-differential state.

Also, as described above, in the control apparatus the differential portion may switch between a plurality of the non-differential states, each of which has a different speed ratio. Further, the vehicular power transmitting apparatus may operate as a stepped transmission in which a plurality of various total speed ratios of the vehicular power transmitting apparatus are selectively established based on a speed ratio of the gear set by the stepped shifting portion and a speed ratio of the differential portion in one non-differential state selected from among the plurality of non-differential states when the differential portion has been placed in a non-differential state. In addition, the control apparatus may execute a shift in which the total speed ratio is changed by the switch between the plurality of non-differential states in the differential portion and the shift in the stepped shifting portion being executed simultaneously. Accordingly, when the differential portion has been placed in a non-differential state, a switched between the plurality of non-differential states in the differential portion can be executed simultaneously with a shift in the stepped shifting portion. Therefore, a shift can be executed using the total speed ratio that is achieved by simultaneously switching between the plurality of non-differential states in the differential portion and executing a shift in the stepped shifting portion. Generally, it was difficult to switch between a plurality of non-differential states in the differential portion and simultaneously execute a shift in the stepped shifting portion so when considering a shift pattern of an upshift in which the total speed ratio of the vehicular power transmitting apparatus gradually decreases, for example, once the differential portion has been switched from a first non-differential state having a high speed ratio into a second non-differential state having a low speed ratio, the differential portion can not be switched back into the first non-differential state because the total speed ratio would reverse and return to what it was. Therefore, for example, after the stepped shifting portion was shifted into the highest gear, the differential portion was then switched into a non-differential state having a small speed ratio in order to obtain an even smaller total speed ratio. On the other hand, switching between a plurality of non-differential states in the differential portion while simultaneously executing a shift in the stepped shifting portion makes it possible to switch between the plurality of non-differential states in the differential portion for each gear of the stepped shifting portion. As a result, the value of the total speed ratio of the vehicular power transmitting apparatus increases, thus enabling a close ratio to be obtained.

Also, as described above, the control apparatus of the second aspect described above makes a) the order of gears into which the stepped shifting portion is shifted as the vehicle speed changes when the differential portion is in the non-differential state, and b) the order of gears into which the stepped shifting portion is shifted as the vehicle speed changes when the differential portion is in the differential state, the same. Accordingly, the shift in the stepped shifting portion can be prevented from being a shift between gears that are far apart from one another when the differential portion is switched between the non-differential state and the differential state.

Also, as described above, the control apparatus of the third aspect described above sets a shift point vehicle speed for changing the total speed ratio by the switch between different non-differential states in the differential portion and the shift in the stepped shifting portion being executed simultaneously, within a vehicle speed range that is set such that a vehicle runs using a combination of the stepped shifting portion that uses the same gear as the higher gear, from among the gear before the shift in the stepped shifting portion and the gear after the shift in the stepped shifting portion, and the differential portion that has been placed in the differential state. Accordingly, during a shift with a switch between the differential state and the non-differential state in the differential portion, the stepped shifting portion is either shifted into an adjacent gear or kept in the same gear after the switch as it was in before the switch. In this way, a shift in which the gear is changed by two or more gears is not executed so shift shock is able to be preferably suppressed or the stepped shifting portion will no longer need to be shifted together with the change in the differential portion.

Also, as described above, the foregoing control apparatus may maintain the same gear in the stepped shifting portion regardless of a switch between the differential state and the non-differential state in the differential portion when a command has been output to the vehicular power transmitting apparatus to change one of output and output torque. Accordingly, when a command to change the output or the output torque has been output to the vehicle power transmitting portion, it is not necessary to execute a shift in the stepped shifting portion so the operation can be simplified even when the differential portion changes between the differential state and the non-differential state.

Also, as described above, the foregoing control apparatus may switch the differential portion between the differential state and the non-differential state, or simultaneously execute a shift in the stepped shifting portion and switch the differential portion between the differential state and the non-differential state, so that the speed of an engine that supplies driving force to a vehicle via the vehicular power transmitting apparatus does not decrease when a command to increase one of output and output torque has been output to the vehicular power transmitting apparatus. As a result, the driver will not feel the unpleasant sensation of the engine speed decreasing when he or she is demanding more output or output torque by depressing the accelerator, for example.

Also, as described above, the foregoing control apparatus may switch the differential portion between the differential state and the non-differential state, or simultaneously execute a shift in the stepped shifting portion and switch the differential portion between the differential state and the non-differential state, so that the speed of an engine that supplies driving force to a vehicle via the vehicular power transmitting apparatus does not increase when a command to reduce one of output and output torque has been output to the vehicular power transmitting apparatus. Accordingly, the driver will not feel the unpleasant sensation of the engine speed not decreasing when he or she is demanding less output or output torque by returning (i.e., letting up on) the accelerator, for example.

Also, as described above, in the foregoing control apparatus, the differential portion may operate as an electric continuously variable transmission that controls the differential state of the input shaft rotation speed and the output shaft rotation speed by the operating state of an electric motor that is connected to a rotating element of the differential mechanism being controlled when the differential portion is in the differential state. Further, the vehicular power transmitting apparatus may operate as a continuously variable transmission that continuously changes the total speed ratio using the stepped shifting portion and the differential portion which has been placed in the differential state in combination. Accordingly, the vehicular power transmitting apparatus is able to be operated as an electric continuously variable transmission by placing the differential portion in a non-differential state according to the operating states of the electric motors.

Also, as described above, the control apparatus of the fourth aspect of the invention includes i) a first control map in which a differential region that places the differential portion in the differential state and a non-differential region that places the differential portion in the non-differential state are determined by a switching line according to a predetermined control parameter, and which is used for switching control to switch the differential portion between the differential state and the non-differential state, ii) a second control map in which a continuously variable shift line that specifies a change of the gear of the stepped shifting portion is determined by the same control parameter as the control parameter in the first control map, and which is used in shift control of the vehicular power transmitting apparatus when the differential portion is in the differential state, and iii) a third control map in which a stepped shift line that specifies a switch between the plurality of non-differential states in the differential portion and/or a change of the gear of the stepped shifting portion, is determined by the same control parameter as the control parameter in the first control map, and which is used in shift control of the vehicular power transmitting apparatus. Further, when the first control map, the second control map, and the third control map are superposed on one another, the control apparatus makes the gear of the stepped shifting portion that is used in a predetermined continuously variable gear region which is defined by being sandwiched between a pair of continuously variable shift lines in the differential region and the switching line, either the same as the gear of the stepped shifting portion that is used in a predetermined stepped gear region which is defined by being sandwiched between a pair of stepped shift lines in the non-differential region and the switching line, or a gear that is adjacent to the gear of the stepped shifting portion that is used in the predetermined stepped gear region which is defined by being sandwiched between the pair of stepped shift lines in the non-differential region and the switching line. Accordingly, during a shift with a switch between the differential state and the non-differential state in the differential portion, a shift in which the gear is changed by two or more gears is not executed in the stepped shifting portion, thereby enabling shift shock to be suppressed.

Also, as described above, the stepped shift line in the third control map may include a portion for executing the switch between the plurality of non-differential states and the shift in the stepped shifting portion substantially simultaneously. Accordingly, a shift can be executed using the total speed ratio that is achieved by simultaneously switching between the plurality of non-differential states in the differential portion and executing a shift in the stepped shifting portion.

Also, as described above, the point of intersection of a switching line in the first control map and a stepped shift line that is associated with both a shift in the stepped shifting portion and a switch among the plurality of non-differential states in the differential portion, from among the plurality of stepped shift lines in the third control map, may be positioned between i) a point of intersection of a switching line in the first control map and a first continuously variable shift line that represents a shift between a) a predetermined gear which is the higher gear, from among the gear before the shift in the stepped shifting portion and the gear after the shift in the stepped shifting portion, according to the stepped shift line with both the shift in the stepped shifting portion and the switch among the plurality of non-differential states in the differential portion, among the plurality of continuously variable shift lines in the second map, and b) a gear that is adjacent to, on the lower gear side of, that predetermined gear, and ii) a point of intersection of a switching line in the first control map and a second continuously variable shift line that represents a shift between the predetermined gear and a gear that is adjacent to, on the higher gear side of, that predetermined gear. Accordingly, during a shift with a switch between the differential state and the non-differential state in the differential portion, the stepped shifting portion is either shifted into an adjacent gear or kept in the same gear after the switch as it was in before the switch. In this way, a shift in which the gear is changed by two or more gears is not executed so shift shock is able to be preferably suppressed or the stepped shifting portion will no longer need to be shifted in combination with the switch in the differential portion.

Also, as described above, the continuously variable shift line in the second control map may determine only the gear of the stepped shifting portion. Therefore, when a switch is made from the continuously variable shift region to the stepped shift region, that switch can be made by only switching the differential portion from the differential state to the non-differential state without executing a shift in the stepped shifting portion.

Also, as described above, when the first control map, the second control map, and the third control map are superposed on one another, the gear used in the stepped shifting portion in the continuously variable gear region may either be the same as the gear used in the stepped shifting portion in a predetermined stepped gear region that is contacting the continuously variable gear region via the switching line, or a gear that is adjacent to the gear used in the stepped shifting portion in the predetermined stepped gear region that is contacting the continuously variable gear region via the switching line. Therefore, the engine speed will neither decrease as a result of a switch from the continuously variable shift region to the stepped shift region that is executed in response to a demand for more required torque, nor increase as a result of a switch from the stepped shift region to the continuously variable shift region that is executed in response to a demand for less required torque. As a result, a change in the engine speed that conflicts with the operational intent of the driver can be appropriately prevented.

Also, the differential mechanism may be formed of a single planetary gear set that has three rotating members, i.e., a first rotating member, a second rotating member, and a third rotating member, that can rotate relative to one another. The first transmitting portion may include apply devices that can selectively connect one of those three rotating members to a non-rotating member, as well as selectively connect two of those three rotating members to each other.

Also, the first rotating member may be connected to the engine, the second rotating member may be connected to the first electric motor, and the third rotating motor may be connected to a transmitting member and a second electric motor.

Also, the differential mechanism may also be formed of two planetary gear sets. Further, the first electric motor or the second electric motor may be provided incorporated into the differential mechanism or in the power transmitting path via a reduction gear.

Also, the differential portion may be switched between the differential state and the non-differential state based on the output of the engine.

Further, the differential portion may be switched between the differential state and the non-differential state based on the output torque of the engine.

Also, according to the foregoing control apparatus, the shift in the stepped shifting portion is a clutch-to-clutch shift that is achieved by releasing a release-side apply element and applying an apply-side apply element. Therefore, shift shock can be preferably suppressed when a clutch-to-clutch shift, which requires minute timing control of the release and application of those apply elements and in which shift shock can easily occur, can be executed simultaneously with a shift in the first transmitting portion.

Also, the differential mechanism is provided with friction apply devices for selectively switching the differential mechanism between a differential state and a non-differential state. Accordingly, a continuously variable shift state of the first transmitting portion, i.e., an unlocked state in which differential operation is possible, and a stepped shift state in which the first transmitting portion is made to have a fixed speed ratio, i.e., a locked state that restricts the differential operation, can be selectively established. Also, the friction apply devices can create a state in which the speed ratio of the first transmitting portion is 1 by selectively engaging any two of the rotating elements of the differential mechanism such that those rotating elements are made to rotate together as a single unit, as well as a state in which the first transmitting portion is made to operate as a step-up gear (i.e., a speed increasing gear) that has a speed ratio of less than 1 by engaging any of the rotating elements of the differential mechanism with a non-rotating member. Accordingly, the differential mechanism functions as a two-speed auxiliary transmission so the gear (i.e., gear speed) can be increased without increasing the dimensions in the axial direction.

Incidentally, in this specification, the term "shift" of the vehicular power transmitting apparatus is used as to a broad concept that includes a case in which either a switch between a differential state and a non-differential state in the differential portion or a shift of the gear in the stepped shifting portion is executed, as well as a case in which both are executed either simultaneously or substantially simultaneously. Also, the term "substantially simultaneously" refers to being within the same period, i.e., within a predetermined period of time.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein.

DETAILED DESCRIPTION OF THE EMBODIMENTS

In the following description and the accompanying drawings, the present invention will be described in more detail in terms of example embodiments.

First Example Embodiment

Figures 1, 2:
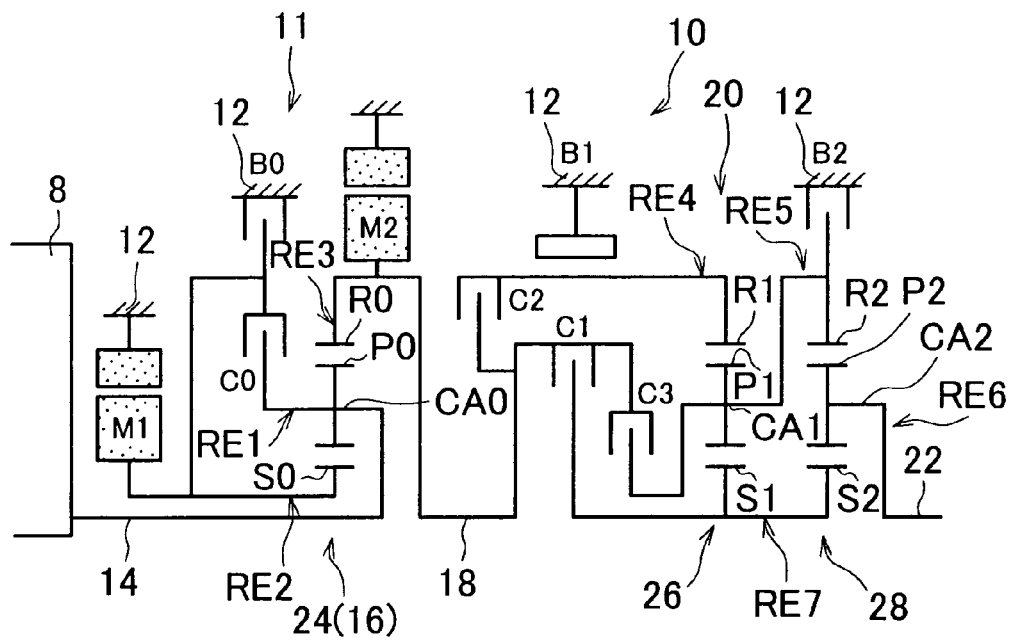
FIG. 1 is a skeleton view of the structure of a power transmitting apparatus of a hybrid vehicle according to one example embodiment of the invention.
FIG. 2 is a clutch and brake application chart showing various application and release combinations of hydraulic friction apply devices used for shift operations when a shift mechanism of the hybrid vehicle according to the first example embodiment shown in FIG. 1 is made to shift gears in a stepped manner.

FIG. 1 is a skeleton view of shift mechanism (power transmitting apparatus) 10 that constitutes part of a power transmitting apparatus of a hybrid vehicle to which a control apparatus according to a first example embodiment of the invention can be applied. In FIG. 1, the shift mechanism 10 includes, in series, an input shaft 14, a differential portion 11, an automatic shifting portion 20, and an output shaft 22, all of which are arranged on a common axis inside a transmission case 12 which is a non-rotating member that is attached to the vehicle body (hereinafter this transmission case 12 will simply be referred to as "case 12"). The input shaft 14 is an input rotating member that is either directly connected to the engine 8 or indirectly connected to the engine 8 via a pulsation absorbing damper (i.e., a pulsation damping device), not shown, and the like. The differential portion 11 is a first transmitting portion or a continuously variable shifting portion that is connected to the input shaft 14. The automatic shifting portion 20 is a second transmitting portion that functions as a stepped transmission that is connected in series via a transmitting member (i.e., a transmitting shaft) 18 in the power transmitting path between the differential portion 11 and driving wheels 38 (see FIG. 5). The output shaft 22 is an output rotating member that transmits output from that automatic shifting portion 20 on down the driveline. Having the differential portion 11 and the automatic shifting portion 20 arranged on the same axis makes the shift mechanism 10 relatively long in the axial direction so it is preferably used in a FR (front-engine, rear-drive) type vehicle in which it is longitudinally mounted in the vehicle, for example. The shift mechanism 10 is provided between the pair of driving wheels 38 and the engine 8. This shift mechanism 10 transmits power from the engine 8 to the pair of driving wheels 38 via a differential gear unit (final reduction device) 36 and a pair of axles and the like, in that order, which make up part of the power transmitting path. The engine 8 is a vehicular driving power source and may be, for example, an external combustion engine or an internal combustion engine such as a gasoline engine or a diesel engine, or the like.

In this way, in the shift mechanism 10 of this example embodiment, the engine 8 and the differential portion 11 are directly connected. The term "directly connected" here means that they are connected without a fluid power transmitting device such as a fluid coupling or a torque converter provided between them, although they may be connected via the pulsation absorbing damper or the like, for example, and still be considered as being directly connected. Incidentally, the shift mechanism 10 has a symmetrical structure with respect to its axis so the lower side is omitted in the skeleton view in FIG. 1.

The differential portion 11 includes a first electric motor M1, a power split device 16, and a second electric motor M2. The power split device 16 is a mechanical differential mechanism which mechanically distributes power that was input to the input shaft 14 from the engine 8 to the first electric motor M1 and the transmitting member 18. The second electric motor M2 is provided so that it rotates together with the transmitting member 18. Incidentally, the second electric motor M2 may be provided at any portion in the power transmitting path between the transmitting member 18 and the driving wheels 38. The first electric motor M1 and the second electric motor M2 in this example embodiment are both so-called motor-generators that can also function as generators. The first electric motor M1 at least functions as a generator (i.e., is capable of generating power) for generating reaction force, and the second generator M2 at least functions as a motor (i.e., an electric motor) that outputs driving force as a driving power source for running.

The power split device 16 has as its main component a single pinion type planetary gear set 24 having a predetermined gear ratio $\rho 0$ of approximately 0.380, for example, a switching clutch C0, and a switching brake B0. The planetary gear set 24 has as rotating elements (i.e., elements) a sun gear S0, pinion gears P0, a carrier CA0 which rotatably and revolvably supports the pinion gears P0, and a ring gear R0 that is in mesh with the sun gear S0 via the pinion gears P0. When the number of teeth on the sun gear S0 is ZS0 and the number of teeth on the ring gear R0 is ZR0, the gear ratio $\rho 0$ is ZS0/ZR0. In this specification, the gear ratio may also be referred to as "speed ratio".

In this power split device 16, the carrier CA0 is connected to the input shaft 14, i.e., the engine 8, the sun gear S0 is connected to the first electric motor M1, and the ring gear R0 is connected to the transmitting member 18. Also, the switching brake B0 is provided between the sun gear S0 and the case 12, and the switching clutch C0 is provided between the sun gear S0 and the carrier CA0. When the switching clutch C0 and the switching brake B0 are released, the three elements of the power split device 16, i.e., the sun gear S0, the carrier CA0, and the ring gear R0, are able to rotate relative to one another, i.e., the power split device 16 is in a state in which differential operation is possible hereinafter this state will be referred to as a "differential state"). Accordingly, the output from the engine 8 can be distributed to the first electric motor M1 and the transmitting member 18, with some of that distributed output from the engine 8 being used to run the first electric motor M1 to generate electric energy to be stored, as well as to run the second electric motor M2 to provide driving force. Accordingly, the differential portion 11 (i.e., the power split device 16) is placed in a so-called continuously variable shift state (i.e., electric CVT state) and the rotation of the transmitting member 18 can be continuously (i.e., in a stepless manner) changed regardless of the predetermined speed of the engine 8. That is, when the power split device 16 is placed in the differential shift state, the differential portion 11 functions as an electric continuously variable transmission in which its speed ratio $\gamma 0$ (the rotation speed of the input shaft 14 divided by the rotation speed of the transmitting member 18) can be continuously (i.e., in a stepless manner) changed from a minimum value $\gamma 0 min$ to a maximum value $\gamma 0 max$.

In this state, when the switching clutch C0 or the switching brake B0 is applied (i.e. switched to an applied state), the power split device 16 changes to a non-differential state in which the foregoing differential operation is not possible. More specifically, when the switching clutch C0 is applied such that the sun gear S0 and the carrier CA0 are integrally connected together, the three elements of the planetary gear set 24, i.e., the sun gear S0, the carrier CA0, and the ring gear R0, are made to rotate together, i.e., integrally by being locked together, such that the power split device 16 is placed in a non-differential state in which the differential operation is not possible. As a result, the differential portion 11 is also placed in a non-differential state. At this time, the rotation speed of the engine 8 matches the rotation speed of the transmitting member 18 so the differential portion 11 (i.e., the power split device 16) is placed in a non-continuously variable shift state, e.g., a fixed shift state, i.e., a stepped shift state, in which it functions as a transmission in which the speed ratio $\gamma 0$ is fixed at 1.

Also, when the switching brake B0 is applied instead of the switching clutch C0 such that the sun gear S0 is locked to the case 12, the power split device 16 is placed in a non-differential state in which the sun gear S0 is unable to rotate. As a result, the differential portion 11 is also placed in a non-differential state. At this time, the ring gear R0 rotates faster than the carrier CA0 so the power split device 16 is placed in a non-continuously variable shift state, e.g., a fixed shift state, i.e., stepped shift state, in which it functions as a speed increasing transmission in which the speed ratio γ0 is fixed at a value less than 1, such as approximately 0.7, for example.

The switching clutch C0 and the switching brake B0 function as differential state switching devices that selectively switch the shift state of the differential portion 11 (i.e., the power split device 16) between a differential state, i.e., an unlocked state (i.e., a disconnected state) and a non-differential state, i.e., a locked state (i.e., a connected state). In the differential state, the differential portion 11 (i.e., the power split device 16) is able to operate as an electric differential device, e.g., is able to perform a continuously variable shift in which it operates as an electric continuously variable transmission that can continuously change the speed ratio (hereinafter this state may also be referred to as a "continuously variable shift state"). Also, in the non-differential state, the differential portion 11 (i.e., the power split device 16) is not able to electrically perform a continuously variable shift (hereinafter this state may also be referred to as a "non-continuously variable shift state"), i.e., it is in a locked state in which a speed ratio change is constantly locked, for example, i.e., in a fixed shift state (i.e., a non-differential state) in which it operates as a single or multiple speed transmission with one or two or more fixed speed ratios.

Ultimately, the switching clutch C0 and the switching brake B0 function as differential limiting devices which place the differential portion 11 in a non-continuously variable shift state and thus limit the operation of the differential portion 11 as an electric differential device or a continuously variable transmission by placing the power split device 16 in a non-differential state, thereby limiting the differential operation of the power split device 16.

The automatic shifting portion 20 functions as a four-speed stepped automatic transmission and includes a single pinion type first planetary gear set 26 and a single pinion type second planetary gear set 28. The first planetary gear set 26 includes a first sun gear S1, first pinion gears P1, a first carrier CA1 which rotatably and revolvably supports the first pinion gears P1, and a first ring gear R1 that is in mesh with the first sun gear S1 via the first pinion gears P1, and has a gear ratio ρ1 of approximately 0.529, for example. The second planetary gear set 28 includes a second sun gear S2, second pinion gears P2, a second carrier CA2 which rotatably and revolvably supports the second pinion gears P2, and a second ring gear R2 that is in mesh with the second sun gear S2 via the second pinion gears P2, and has a gear ratio ρ2 of approximately 0.372, for example. When the number of teeth of the first sun gear S1 is ZS1, the number of the teeth on the first ring gear R1 is ZR1, the number of teeth on the second sun gear S2 is ZS2, and the number of teeth on the second ring gear R2 is ZR2, the gear ratio ρ1 is ZS1/ZR1 and the gear ratio ρ2 is ZS2/ZR2.

In the automatic shifting portion 20, the first sun gear S1 and the second sun gear S2 are integrally connected together as well as selectively connected to the transmitting member 18 via the first clutch C1. The second carrier CA2 and the second ring gear R2 are integrally connected together as well as selectively connected to the case 12 via the second brake B2 and selectively connected to the transmitting member 18 via the third clutch C3. The first ring gear R1 is selectively connected to the case 12 via the first brake B1 as well as selectively connected to the transmitting member 18 via the second clutch C2, and the second carrier CA2 is connected to the output shaft 22. In this way, the automatic shifting portion 20 and the transmitting member 18 are selectively connected together via the first clutch C1, the second clutch C2, and the third clutch C3 which are used to establish various gears in the automatic shifting portion 20. In other words, the first clutch C1, the second clutch C2, and the third clutch C3 are input clutches of the automatic shifting portion 20, and function as apply devices for selectively changing the power transmitting path between the transmitting member 18 and the automatic shifting portion 20, i.e., from the differential portion 11 (i.e., the transmitting member 18) and the driving wheels 38, between a power transmittable state in which power is able to be transmitted along that power transmitting path and a power transmission-interrupted state in which power is not able to be transmitted (i.e., the flow of power is interrupted) along that power transmitting path. That is, applying at least one of the first clutch C1, the second clutch C2, and the third clutch C3 places the power transmitting path in the power transmittable state. Conversely, releasing the first clutch C1, the second clutch C2, and the third clutch C3 at the same time places the power transmitting path in the power transmission-interrupted state.

The switching clutch C0, the first clutch C1, the second clutch C2, the third clutch C3, the switching brake B0, the first brake B1, and the second brake B2 (hereinafter these will simply be referred to as "clutches C" and "brakes B" when not particularly specified) are hydraulic friction apply devices that are often used in conventional vehicular automatic transmissions. The clutches C may be wet type multiple disc clutches in which a plurality of stacked friction plates are pressed together by a hydraulic actuator, and the brakes B may be band brakes in which one end of one or two bands that are wound around the outer peripheral surface of a rotating drum is pulled tight by a hydraulic actuator. The hydraulic friction apply devices selectively connect members on either side of them.

As described above, the switching clutch C0 and the switching brake B0 are both provided in the power split device 16 of the shift mechanism 10 having the foregoing structure. The stepped shift state is established by the automatic shifting portion 20 operating as a stepped automatic transmission and the differential portion 11 being in a fixed shift state by either the switching clutch C0 or the switching brake B0 being applied. The continuously variable shift state in which the vehicular power transmitting apparatus 10 is made to operate as an electric continuously variable transmission is established by the automatic shifting portion 20 and the differential portion 11 being in a continuously variable shift state by both the switching clutch C0 and the switching brake B0 being released.

When the differential portion 11 is in a non-continuously variable shift state such that the shift mechanism 10 functions as a stepped transmission, any gear from first gear through seventh gear, reverse (i.e., reverse gear), or neutral may be selectively established by selectively applying either the switching clutch C0 or the switching brake B0, together with the first clutch C1, the second clutch C2, the third clutch C3, the first brake B1, or the second brake B2 in the combinations shown in FIG. 2. In the forward gears, a total speed ratio γT (=the rotation speed NIN of the input shaft 14/the rotation speed NOUT of the output shaft 22) of the shift mechanism 10 that changes in substantially equal ratio between speed ratios of adjacent gears is obtained in a stepped manner for each gear, and that total speed ratio width (=the speed ratio γT1 of first gear/the speed ratio γT7 of seventh gear) is obtained over a wide range. The total speed ratio γT of the shift mechanism 10 is the total speed ratio γT for the overall shift mechanism 10 that is produced based on the speed ratio γ0 of the differential portion 11 and the speed ratio γA of the automatic shift portion 20.

As shown in detail in the clutch and brake application chart in FIG. 2, first gear which has the largest speed ratio γT1, e.g., approximately 3.683, can be established by applying the switching clutch C0, the first clutch C1, and the second brake B2. Second gear which has a speed ratio γT2 smaller than that of first gear, e.g., approximately 2.669, can be established by applying the switching brake B0, the first clutch C1, and the second brake B2. Third gear which has a speed ratio γT3 smaller than that of second gear, e.g., approximately 1.909, can be established by applying the switching clutch C0, the first clutch C1, the first brake B1. Fourth gear which has a speed ratio γT4 smaller than that of third gear, e.g., approximately 1.383, can be established by applying the switching brake B0, the first clutch C1, and the first brake B1. Fifth gear which has a speed ratio γT5 smaller than that of fourth gear, e.g., approximately 1.000, can be established by applying the switching clutch C0, the first clutch C1, and the third clutch C3. Sixth gear which has a speed ratio γT6 smaller than that of fifth gear, e.g., approximately 0.661, can be established by applying the switching clutch C0, the third clutch C3, and the first brake B1. Seventh gear which has a speed ratio γT7 smaller than that of sixth gear, e.g., approximately 0.479, can be established by applying the switching brake B0, the third clutch C3, and the first brake B1. Also, reverse which is used during either engine-running or motor-running and which has a speed ratio γR between that of second gear and that of third gear, e.g., approximately 1.951, can be established by applying either the first clutch C1 or the second clutch C2, and the second brake B2. Incidentally, this reverse gear is normally established when the differential portion 11 is in a non-continuously variable shift state. Also, when the shift mechanism 10 is in neutral "N"; only the second brake B2, for example, is applied.

As is evident from the foregoing description and FIG. 2, in the shift mechanism 10 in this example embodiment, a shift into any one of the seven forward gears is performed by combining a two-stage shift by a clutch-to-clutch shift in which one of the switching clutch C0 and the switching brake B0 is released at the same time the other is applied, with the four-stage shift by a clutch-to-clutch shift in which one of the first clutch C1, the second clutch C2, the third clutch C3, the first brake B1, and the second brake B2 is released at the same time another one of those is applied. That is, the shifts between first gear and second gear, second gear and third gear, third gear and fourth gear, fourth gear and fifth gear, and sixth gear and seventh gear are performed by simultaneously executing a shift in the first transmitting portion (i.e., the differential portion 11) and a shift in the second transmitting portion (i.e., the automatic shifting portion 20) within the same shift period, and the shift between fifth gear and sixth gear is performed by a clutch-to-clutch shift entirely in the second transmitting portion.

Also, when the differential portion 11 is placed in the continuously variable shift state such that the shift mechanism 10 functions as a continuously variable transmission, both the switching clutch C0 and the switching brake B0 are released so the differential portion 11 functions as a continuously variable transmission, and the automatic shifting portion 20 that is inline with the differential portion 11 functions as a forward four-speed stepped transmission. Accordingly, the rotation speed input to the automatic shifting portion 20, i.e., the rotation speed of the transmitting member 18, changes in a continuous (i.e., stepless) manner, thereby enabling a continuous speed ratio width at that gear M to be obtained such that the overall total speed ratio γT changes continuously despite the fact that the speed ratio γA of the automatic shifting portion 20 changes in steps by having a gear automatically be selected from among the four forward gears of the automatic shifting portion 20. Accordingly, the total speed ratio γT of the shift mechanism 10 can be obtained in a continuous (i.e., stepless) manner.

That is, when the shift mechanism 10 functions as a continuously variable transmission, the speed ratio γ0 of the differential portion 11 is controlled to achieve the total speed ratio γT that changes continuously between first gear, second gear, third gear, and fourth gear of the automatic shifting portion 20 while both the switching clutch C0 and the switching brake B0 are released. As a result, the total speed ratio γT of the overall shift mechanism 10 can be achieved in a continuous or stepless manner.

Figure 3:
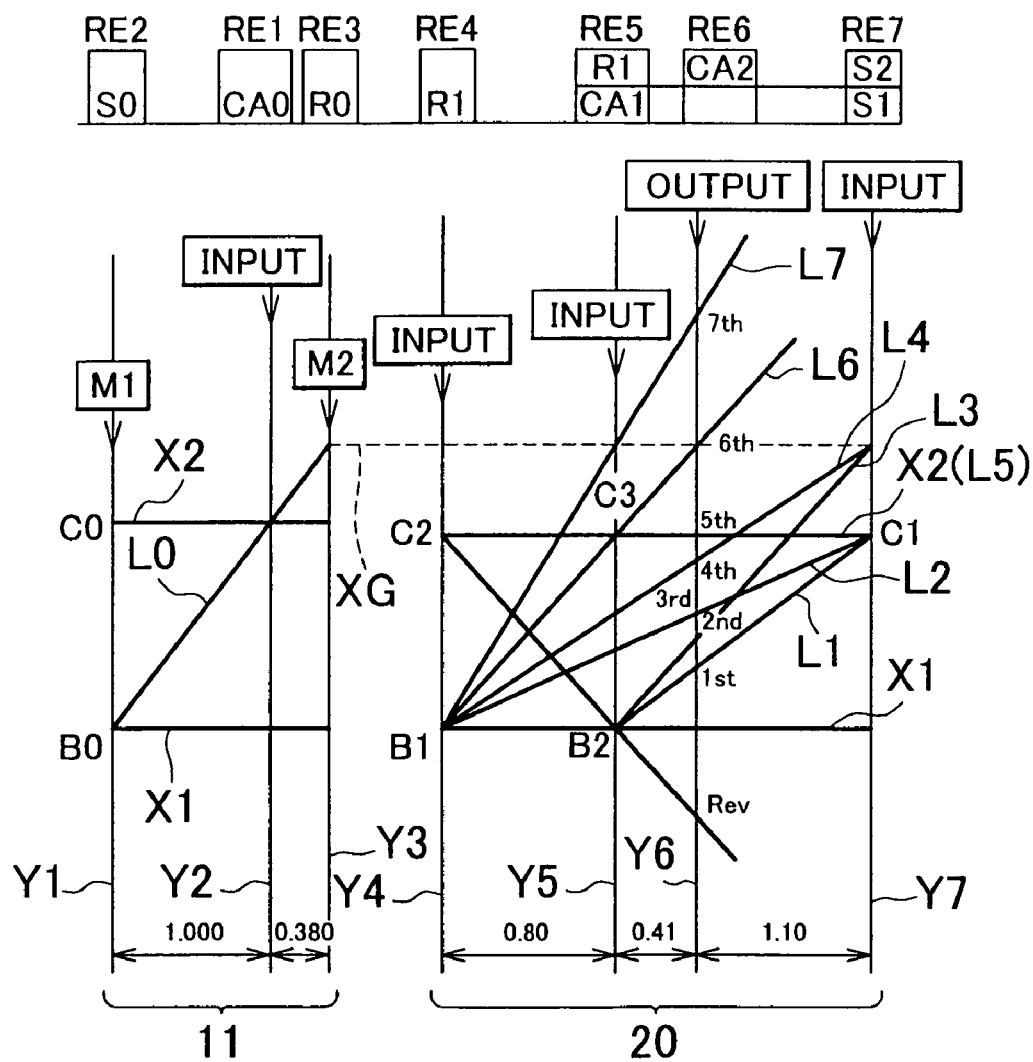
FIG. 3 is an alignment graph illustrating the relative rotation speeds at each gear when the shift mechanism of the hybrid vehicle according to the first example embodiment shown in FIG. 1 is made to shift gears in a stepped manner.

FIG. 3 is an alignment graph which shows the correlative relationships, on straight lines, among the rotation speeds of the various rotating elements that are in different connective states in each gear in the shift mechanism 10 that is made up of the differential portion 11 which functions as the continuously variable shifting portion or the first transmitting portion, and the automatic shifting portion 20 which functions as the second transmitting portion. This alignment graph in FIG. 3 is a two-dimension coordinate system having a horizontal axis that represents the relationship among the gear ratios ρ of the planetary gear sets 24, 26, and 28, and a vertical axis that represents the relative rotation speeds. The lower horizontal line X1 represents a rotation speed of zero, the upper horizontal line X2 represents a relative rotation speed of 1.0, i.e., the rotation speed NE of the engine 8 that is connected to the input shaft 14, and the horizontal line XG which is shown by the broken line represents the rotation speed of the transmitting member 18.

Also, the three vertical lines Y1, Y2, and Y3 corresponding to the three elements of the power split device 16 that forms the differential portion 11 represent, in order from left to right, the relative rotation speeds of the sun gear S0 corresponding to a second rotating element (second element) RE2, the carrier CA0 corresponding to a first rotating element (first element) RE1, and the ring gear R0 corresponding to a third rotating element (third element) RE3. The intervals between the vertical lines Y1, Y2, and Y3 are determined by the gear ratio ρ0 of the planetary gear set 24. Further, the four vertical lines Y4, Y5, Y6, and Y7 of the automatic shifting portion 20 represent, in order from left to right, the first ring gear R1 corresponding to a fourth rotating element RE4, the first carrier CA1 and the second ring gear R2 which are connected together and correspond to a fifth rotating element (fifth element) RE5, the second carrier CA2 corresponding to a sixth rotating element (sixth element) RE6, and the first sun gear S1 and the second sun gear S2 which are connected together and correspond to a seventh rotating element (seventh element) RE7. The intervals between them are determined according to the gear ratio ρ1 of the first planetary gear set 26 and the gear ratio ρ2 of the second planetary gear set 28. In the relationships among the spaces between the vertical axes in the alignment graph, when the space between the sun gear and the carrier is an interval corresponding to 1, the space between the carrier and the ring gear is an interval corresponding to the gear ratio ρ of the planetary gear set. That is, in the differential portion 11, the space between the vertical lines Y1 and Y2 is set to an interval corresponding to 1, and the space between vertical lines Y2 and Y3 is set to an interval corresponding to the gear ratio ρ0. Also, in the automatic shifting portion 20, the space between the sun gear and the carrier in each of the second and third planetary gear sets 26 and 28 is set to an interval corresponding to 1, and the space between the carrier and the ring gear is set to an interval corresponding to ρ.

When expressed using the alignment graph in FIG. 3, the shift mechanism 10 in this example embodiment is structured such that in the power split device 16 (i.e., the differential portion 11), the first rotating element RE1 (i.e., the carrier CA0) of the planetary gear set 24 is connected to the input shaft 14, i.e., the engine 8, as well as selectively connected to the second rotating element (i.e., the sun gear S0) RE2 via the switching clutch C0, the second rotating element RE2 is connected to the first electric motor M1 as well as selectively connected to the case 12 via the switching brake B0, and the third rotating element (i.e., the ring gear R0) RE3 is connected to both the transmitting member 18 and the second electric motor M2 such that the rotation of the input shaft 14 is transmitted (input) to the automatic shifting portion 20 via the transmitting member 18. At this time, the correlative relationship between the rotation speed of the first sun gear S1 and the rotation speed of the first ring gear R1 is shown by the sloped straight line L0 passing through the point of intersection of Y2 and X2.

For example, if the rotation speed of the sun gear S0 represented by the point of intersection of the straight line L0 and the vertical line Y1 is increased or decreased by controlling the rotation speed of the first electric motor M1 when a switch is made to a continuously variable shift state (i.e., a differential state) in which the first rotating element RE1, the second rotating element RE2, and the third rotating element RE3 are able to rotate relative to one another, e.g., a continuously variable shift state (i.e., a differential state) in which at least the second rotating element RE2 and the third rotating element RE3 are able to rotate relative one another at different speeds, by the switching clutch C0 and the switching brake B0 being released, then when the rotation speed of the ring gear R0 which is restricted by the vehicle speed V and represented by the point of intersection of the straight line L0 and the vertical line Y3 is substantially constant, the rotation speed of the carrier CA0 represented by the point of intersection of the straight line L0 and the vertical line Y2, i.e., the engine speed NE, will increase or decrease.

Also, when the sun gear S0 and the carrier CA0 are connected together by applying the switching clutch C0, the power split device 16 is placed in a non-differential state in which the three rotating elements RE1, RE2, and RE3 rotate together and the second rotating element RE2 and the third rotating element RE3 are unable to rotate at different speeds. Therefore, the straight line L0 will match the horizontal line X2, and the transmitting member 18 will rotate at the same speed as the engine speed NE. Also, if the sun gear S0 is connected to the case 12 by applying the switching brake B0, the power split device 16 is placed in a non-differential state in which the second rotating element RE2 stops rotating, and at least the second rotating element RE2 and the third rotating element RE3 are unable to rotate at different speeds. Therefore, the straight line L0 becomes as shown in FIG. 3 with the differential portion 11 being made to function as a speed increasing mechanism such that the rotation speed of the ring gear R0 represented by the point of intersection of the straight line L0 and the vertical line Y3, i.e., the rotation speed of the transmitting member 18, is input to the automatic shifting portion 20 at a speed that is faster than the engine speed NE.

Also, in the automatic shifting portion 20, the fourth rotating element RE4 is selectively connected to the transmitting member 18 via the first clutch C1, as well as selectively connected to the case 12 via the first brake B1. The fifth rotating element RE5 is selectively connected to the transmitting member 18 via the third clutch C3, as well as selectively connected to the case 12 via the second brake B2. The sixth rotating element RE6 is connected to the output shaft 22, and the seventh rotating element RE7 is selectively connected to the transmitting member 18 via the first clutch C1.

As shown in FIG. 3, in the automatic shifting portion 20, the rotation speed of the output shaft 22 in first gear, which is established by applying the switching clutch C0, the first clutch C1, and the second brake B2, is shown at the point of intersection of i) the sloped straight line L1 that passes through both the point of intersection of the horizontal line X2 and the vertical line Y7 that represents the rotation speed of the seventh rotating element RE7 and the point of intersection of the horizontal line X1 and the vertical line Y5 that represents the rotation speed of the fifth rotating element RE5, and ii) the vertical line Y6 that represents the rotation speed of the sixth rotating element RE6 that is connected to the output shaft 22. Similarly, the rotation speed of the output shaft 22 in second gear, which is established by applying the switching brake B0, the first clutch C1, and the second brake B2, is shown at the point of intersection of the sloped straight line L3 and the vertical line Y6 that represents the rotation speed of the sixth rotating element RE6 that is connected to the output shaft 22. Also, the rotation speed of the output shaft 22 in third gear, which is established by applying the switching clutch C0, the first clutch C1, and the first brake B1, is shown at the point of intersection of the sloped straight line L2 and the vertical line Y6 that represents the rotation speed of the sixth rotating element RE6 that is connected to the output shaft 22. Similarly, the rotation speed of the output shaft 22 in fourth gear, which is established by applying the switching clutch C0, the first clutch C1, and the first brake B1, is shown at the point of intersection of the straight line L4 and the vertical line Y6 that represents the rotation speed of the sixth rotating element RE6 that is connected to the output shaft 22. Also, the rotation speed of the output shaft 22 in fifth gear, which is established by applying the switching clutch C0, the first clutch C1, and the third clutch C3, is shown at the point of intersection of the horizontal straight line L5 and the vertical line Y6 that represents the rotation speed of the sixth rotating element RE6 that is connected to the output shaft 22. Similarly, the rotation speed of the output shaft 22 in sixth gear, which is established by applying the switching clutch C0, the third clutch C3, and the first brake B1, is shown at the point of intersection of the sloped straight line L6 and the vertical line Y6 that represents the rotation speed of the sixth rotating element RE6 that is connected to the output shaft 22. Similarly, the rotation speed of the output shaft 22 in seventh gear, which is established by applying the switching brake B0, the third clutch C3, and the first brake B1, is shown at the point of intersection of the sloped straight line L7 and the vertical line Y6 that represents the rotation speed of the sixth rotating element RE6 that is connected to the output shaft 22. By applying the switching clutch C0 in first gear, third gear, fifth gear, and sixth gear, power from the differential portion 11, i.e., the power split device 16, is input to the fourth rotating element RE4, the fifth rotating element RE5, or the seventh rotating element RE7 at the same speed as the engine speed NE. However, in second gear, fourth gear, or seventh gear, applying the switching brake B0 instead of the switching clutch C0 results in power from the differential portion 11 being input to the fifth rotating element RE5 or the seventh rotating element RE7 at a speed greater than the engine speed NE.

Figure 4:
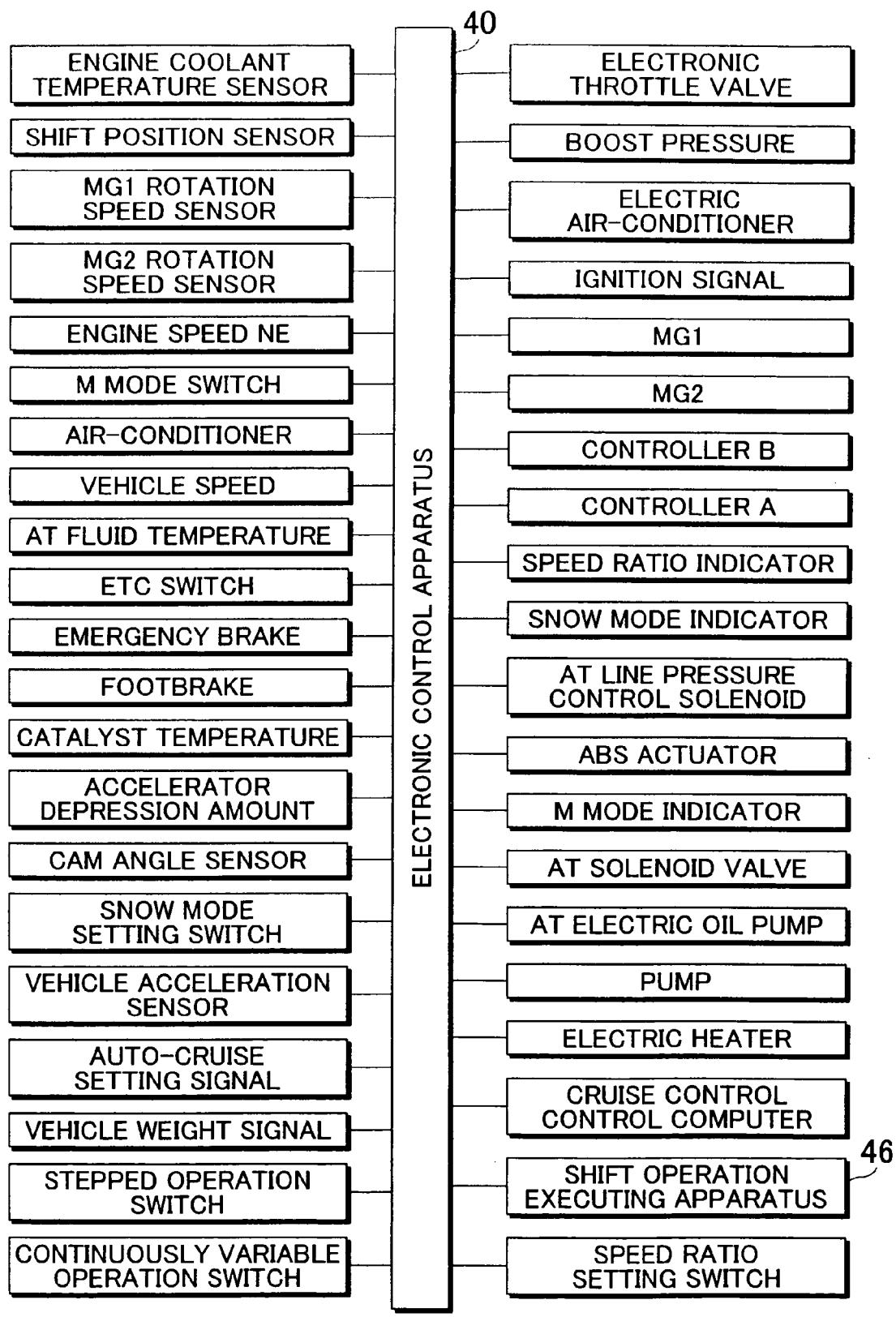
FIG. 4 is a view showing input and output signals of an electronic control apparatus provided in the power transmitting apparatus in the first example embodiment shown in FIG. 1.

FIG. 4 shows an example of signals input to (i.e., received by) and output from an electronic control apparatus 40 for controlling the shift mechanism 10 in this example embodiment. This electronic control apparatus 40 includes a so-called microcomputer that includes a CPU, ROM, RAM, and input/output interfaces and the like. The electronic control apparatus 40 executes drive control, such as shift control of the automatic shifting portion 20 and hybrid drive control related to the engine 8 and the first and second electric motors M1 and M2, by processing those signals according to programs stored in advance in the ROM while using the temporary storage function of the RAM.

Various signals are input to this electronic control apparatus 40 from various sensors and switches and the like, as shown in FIG. 4. Among these signals are a signal indicative of the engine coolant temperature TEMPW, a signal indicative of a shift position PSH, a signal indicative of the engine speed NE which is the speed of the engine 8; a signal indicative of a speed ratio setting value, a signal indicative of a command to operate in a M mode (manual shift running mode), a signal indicative of operation of an air-conditioner, a signal indicative of the vehicle speed V corresponding to the rotation speed NOUT of the output shaft 22, a signal indicative of the hydraulic fluid temperature of the automatic shifting portion 20, a signal indicative of an emergency brake operation, a signal indicative of a footbrake operation a signal indicative of the catalyst temperature, and a signal indicative of the accelerator depression amount θACC which is the amount that an accelerator pedal is being depressed which corresponds to the amount of output required by the driver. Other signals received by the electronic control apparatus 40 include a signal indicative of the cam angle, a signal indicative of a snow mode setting, a signal indicative of the longitudinal acceleration G of the vehicle, a signal indicative of auto-cruise running, a signal indicative of the vehicle mass (i.e., vehicle weight), signals indicative of the wheel speed of each wheel, a signal indicative of operation of a stepped-operation switch for switching the differential portion 11 (i.e., the power split device 16) to a stepped shift state (i.e., a locked state) in order to make the shift mechanism 10 function as a stepped transmission, a signal indicative of operation of a continuously-variable-operation switch for switching the differential portion 11 (i.e., the power split device 16) to a continuously variable shift state (i.e., a differential state) in order to make the shift mechanism 10 function as a continuously variable transmission, a signal indicative of the rotation speed NM1 of the first electric motor M1 (hereinafter simply referred to as "first electric motor rotation speed NM1"), a signal indicative of the rotation speed NM2 of the second electric motor M2 hereinafter simply referred to as "second electric motor rotation speed NM2"), and a signal indicative of the SOC (state-of-charge) of a power storage device 60 (see FIG. 5), and the like.

The electronic control apparatus 40 also outputs various signals. Among these signals are control signals that are output to an engine output control apparatus 43 (see FIG. 5) to control engine output, such as a drive signal to a throttle actuator 97 that operates the throttle valve opening amount θTH of an electronic throttle valve 96 provided in an intake passage 95 of the engine 8, a fuel supply quantity signal that controls the amount of fuel supplied to the intake passage 95 or the cylinders of the engine 8 from a fuel injection apparatus 98, an ignition signal that dictates the ignition timing of the engine 8 from an ignition apparatus 99, and a pressure boost adjusting signal for adjusting the boost pressure. Other signals output from the electronic control apparatus 40 include an electric air-conditioner drive signal for operating an electric air-conditioner, command signals indicative of commands to operate the electric motors M1 and M2, a shift position (operating position) indication signal for operating a shift indicator, a speed ratio indication signal for indicating the speed ratio, a snow mode indication signal for indicating when the vehicle is being operated in the snow mode, an ABS activation signal to activate an ABS actuator that prevents the wheels from slipping during braking, an M mode indication signal that indicates that the M mode has been selected, valve command signals that operate electromagnetic valves in a hydraulic pressure control circuit 42 (see FIG. 5) for controlling hydraulic actuators of the hydraulic friction apply devices in the differential portion 11 and the automatic shifting portion 20, a drive command signal for operating an electric hydraulic pump which is the source for the base pressure in the hydraulic pressure control circuit 42, a signal for driving an electric heater, and a signal that is output to a computer for controlling cruise control, and the like.

Figure 5:
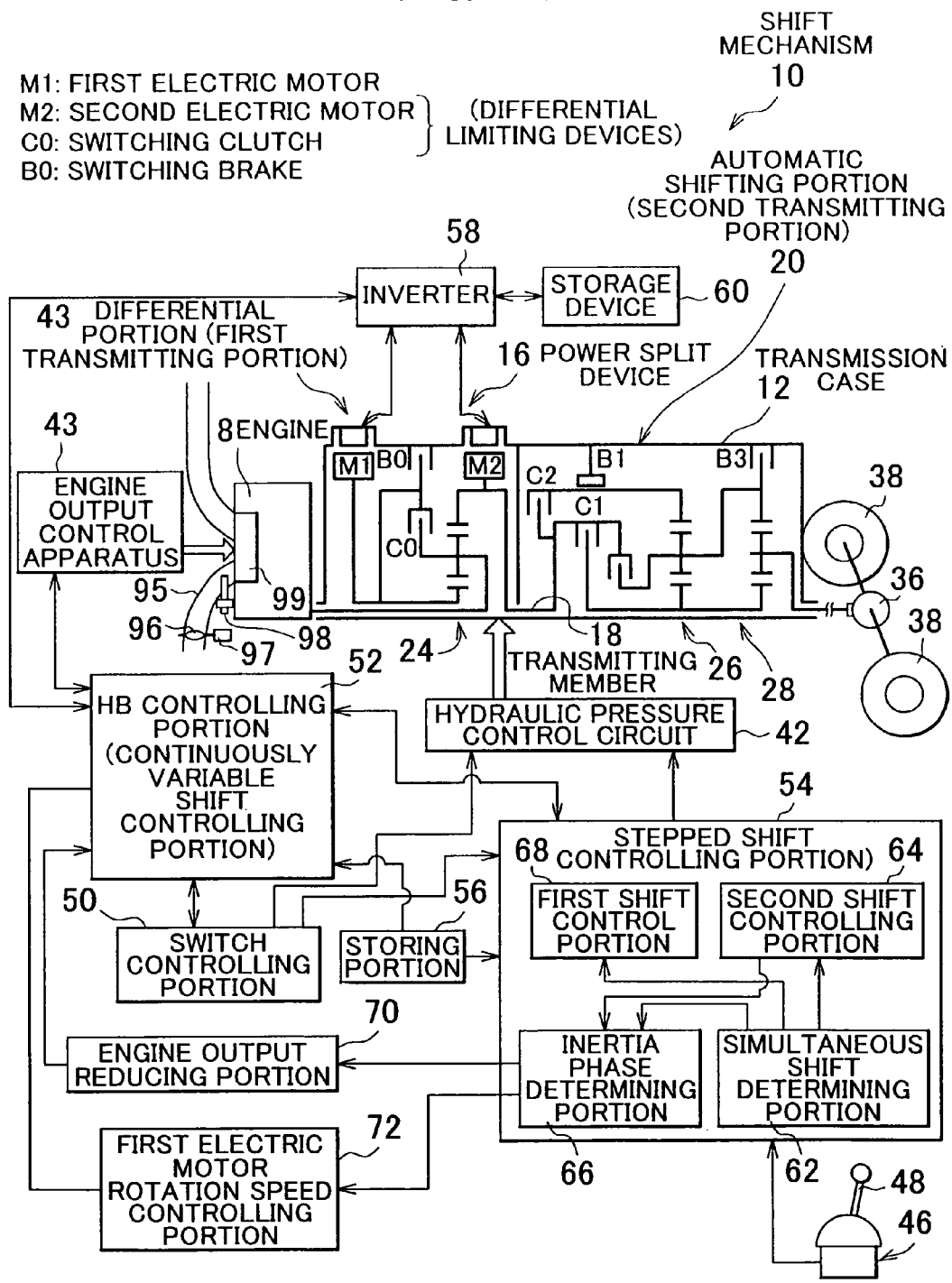
FIG. 5 is a functional block line diagram showing the main portions of the control operations of the electronic control apparatus shown in FIG. 4.

FIG. 5 is a functional block line diagram showing the main portions of the functions controlled by the electronic control apparatus 40. In FIG. 5, a stepped shift controlling portion 54 determines whether a shift should be executed in the shift mechanism 10 based on the vehicle state as indicated by the vehicle speed V and the required output torque TOUT of the automatic shifting portion 20 from a shift line graph (relationship, shift map) shown by the solid lines and alternate long and short dashes lines in FIG. 6 that was stored in advance in a storing portion 56, for example. When the stepped shift controlling portion 54 determines that a shift should be executed, the stepped shift controlling portion 54 then executes automatic shift control in the automatic shifting portion 20 to establish the gear that was determined. At this time, the stepped shift controlling portion 54 outputs a command (such as a shift output command or a hydraulic pressure command) either directly or indirectly to the hydraulic pressure control circuit 42 to apply and/or release the hydraulic friction apply devices that are involved in the shift, including the switching clutch C0 and the switching brake B0, to establish the gear according to the clutch and brake application chart shown in FIG. 2, for example. In response to that command, the hydraulic pressure 42 actuates the electromagnetic valves in the hydraulic pressure control circuit 42 and operates the hydraulic actuators of the hydraulic friction apply devices that are involved in that shift so that the hydraulic friction apply device on the release side that is involved in the shift releases and the hydraulic friction apply device on the apply side that is involved in the shift applies and, as a result, the shift in the automatic shifting portion 20 is executed.

When the continuously variable shift mode is selected, the hybrid controlling portion 52 functions as a continuously variable shift controlling portion that operates the engine 8 in an efficient operating region when the shift mechanism 10 is in the continuously variable shift state, i.e., when the differential portion 11 is in the differential state, while controlling the total speed ratio γT in a continuously variable manner by changing both the distribution of driving force from the engine 8 and the second electric motor M2 and the reaction force from the power generated by the first electric motor M1 so that they are optimum and controlling the speed ratio γ0 of the differential portion 11 that functions as an electric continuously variable transmission. For example, the hybrid controlling portion 52 calculates a target (i.e., required) output of the vehicle from the vehicle speed V and the accelerator depression amount θACC as the amount of output required by the driver at the vehicle speed at which the vehicle is running at that time. The hybrid controlling portion 52 then calculates the necessary total target output from that target output of the vehicle and the charging required value, and calculates the target engine output taking into account transfer loss, loads from auxiliary devices, and the assist torque of the second motor M2 and the like to obtain that total target output. The hybrid controlling portion 52 then controls the output of the engine 8 and the total speed ratio γT to obtain the engine speed NE and the engine torque TE that can achieve that target engine output, as well as controls the amount of power generated by the first electric motor M1.

The hybrid controlling portion 52 executes that control taking into account the gear of the automatic shifting portion 20 during continuously variable shift control to improve power performance and fuel efficiency and the like. With this kind of hybrid control, the differential portion 11 is made to function as an electric continuously variable transmission in order to match the engine speed NE that is set so that the engine 8 operates in an efficient operating region and the rotation speed of the transmitting member 18 that is set by the vehicle speed V and the gear of the automatic shifting portion 20. That is, the hybrid controlling portion 52 controls the engine 8 so that it operates along the optimum fuel efficiency curve (fuel efficiency map, relationship) for the engine 8, not shown, which is obtained through testing beforehand and stored in the storing portion 56, for example, in order to achieve both drivability and fuel efficiency during continuously variable shift running in a two-dimension coordinate system formed by the engine speed NE and the output torque (i.e., the engine torque) TE of the engine 8. For example, the hybrid controlling portion 52 determines the target value of the total speed ratio $\gamma T$ of the shift mechanism 10 to achieve the engine torque TE and engine speed NE for generating the necessary engine output to satisfy the target output (i.e., the total target output and the required driving force). The hybrid controlling portion 52 then controls the speed ratio $\gamma 0$ of the differential portion 11 taking into account the gear of the automatic shifting portion 20 so as to obtain that target value, and controls the total speed ratio $\gamma T$ within the range through which shifting is possible, such as a range from 13 to 0.5, for example.

At this time, the hybrid controlling portion 52 supplies electric energy that was generated by the first electric motor M1 to the second electric motor M2 and the power storage device 60 via an inverter 58. Accordingly, most of the power from the engine is mechanically transmitted to the transmitting member 18. However, some of the power from the engine 8 is used (i.e., consumed) to generate power with the first electric motor M1 where it is converted into electric energy. This electric energy is then supplied via the inverter 58 to the second electric motor M2 where it is used to drive the second electric motor M2 in order to generate power which is then transmitted to the transmitting member 18. The equipment related to the process from the generation of this electric energy until that electric energy is consumed by the second electric motor M2 converts some of the power from the engine 8 into electric energy and provides an electrical path for that electric energy until that electric energy is converted into mechanical energy.

Also, the hybrid controlling portion 52 is also functionally provided with an engine output controlling portion which executes output control of the engine 8 to generate the necessary engine output by outputting commands, either individually or in combination, to the engine output control apparatus 43 to control not only the electronic throttle valve 96 open and closed by the throttle actuator 97 for throttle control, but also the fuel injection quantity and fuel injection timing by the fuel injection apparatus 98 for fuel injection control, and the ignition timing by the ignition apparatus 99 such as an igniter for ignition timing control. In response to the commands from the hybrid controlling portion 52, the engine output control apparatus 43 executes engine torque control, e.g., controls the electronic throttle valve 96 open and closed using the throttle actuator 97 for throttle control, controls the fuel injection by the fuel injection apparatus 98 for fuel injection control, and controls the ignition timing by the ignition apparatus 99 such as the igniter for ignition timing control.

Figure 6:
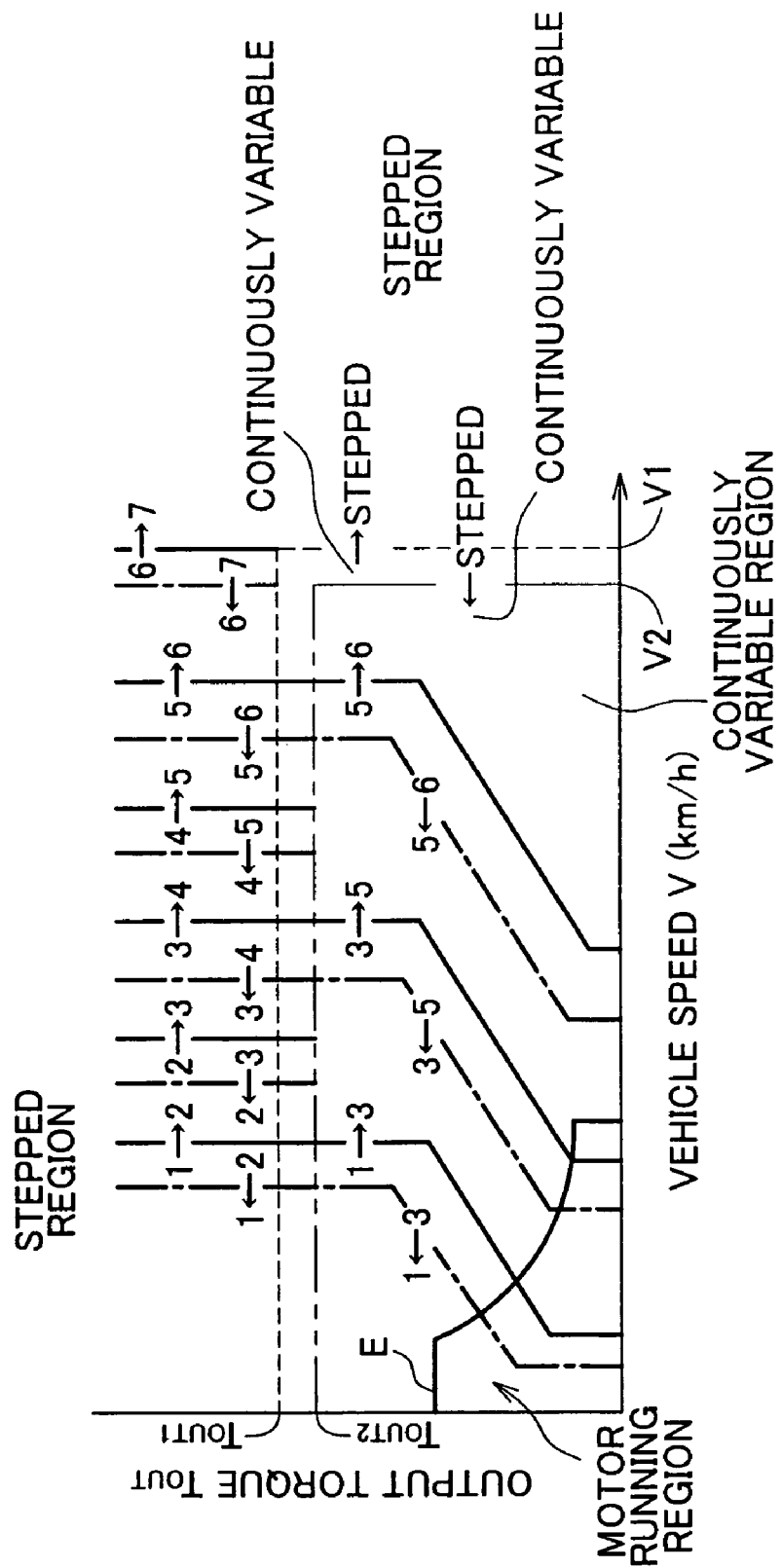
FIG. 6 is a view showing examples of a shift line graph which is stored in advance and used for making shift determinations, a switching line graph which is stored in advance and used for making switching determinations regarding the shift state of the shift mechanism, and a driving power source switching line graph with boundary lines which is stored in advance and used for making determinations with respect to switching between engine-running and motor-running, all of the line graphs being formed on the same two-dimensional coordinate system with vehicle speed and output torque as parameters.

Also, the hybrid controlling portion 52 can make the vehicle run using the motor using the electric CVT function (for differential operation) of the differential portion 11, regardless of whether the engine 8 is stopped or idling. The solid line E in FIG. 6 is the boundary line between the engine-running region and the motor-running region for switching the driving power source for take-off/running (hereinafter simply referred to as "for running") of the vehicle between the engine 8 and an electric motor such as the second electric motor M2, i.e., for switching the vehicle between so-called engine-running in which the vehicle is made to take-off/run (hereinafter simply referred to as "run") using the engine 8 as the driving power source for running, and so-called motor-running in which the vehicle is driven using the second electric motor M2 as the driving power source for running. The relationship represented by the boundary line (i.e., the solid line E) in FIG. 6 is one example of a driving power source switching line graph (i.e., driving power source map) that forms a two-dimensional coordinate system having the vehicle speed V and the output torque TOUT which is a value related to driving power as parameters. This driving power source switching line graph is stored in advance along with the shift line graph (i.e., shift map) shown by the solid lines and the alternate long and short dashes lines in FIG. 6, for example, in the storing portion 56.

Then the hybrid controlling portion 52 determines whether the vehicle is in the motor-running region or the engine-running region based on the vehicle state as indicated by the required output torque TOUT and the vehicle speed V driving power source switching line graph in FIG. 6, for example. The hybrid controlling portion 52 then executes either motor-running or engine-running based on that determination. In this way, the motor-running by the hybrid controlling portion 52 is executed in the relatively low output torque TOUT region, i.e., the low engine torque TE region, in which the engine efficiency is typically worse than it is in the high torque region, or the relatively low vehicle speed V region, i.e., low load region, as is evident from FIG. 6. Accordingly, take-off using the motor is normally given priority over take-off using the engine. However, depending on the vehicle state, e.g., when the accelerator pedal is depressed so much that the required output torque TOUT, i.e., the required engine torque TE, is so large that it is outside of the motor running region in the driving power source switching line graph in FIG. 6 during take-off of the vehicle, the engine may also normally be used for take-off.

During motor running, the hybrid controlling portion 52 is also able to keep the engine speed NE at zero or substantially zero as necessary by controlling the first electric motor rotation speed NM1 to a negative rotation speed, e.g., by rotating the first electric motor M1 idly, using the electric CVT function (differential operation) of the differential portion 11 in order to suppress drag from the stopped engine 8 and thus improve fuel efficiency.

Also, in the engine-running region as well, so-called torque assist for adding to the power of the engine 8 is made possible by the hybrid controlling portion 52 supplying electric energy from the first electric motor M1 and/or electric energy from the power storage apparatus 60 according to the electrical path described above to the second electric motor M2, and driving that second electric motor M2 so as to apply torque to the driving wheels 38. Accordingly, the combination of engine-running and motor-running (i.e., engine-running+motor-running) is also included in the concept of engine-running in this example embodiment.

Also, the hybrid controlling portion 52 keeps the engine speed NE substantially constant and controls it to an appropriate speed by controlling the first electric motor rotation speed NM1 and/or the second electric motor rotation speed NM2 using the electric CVT function of the differential portion 11, regardless of whether the vehicle is stopped or running For example, as is evident from the alignment graph in FIG. 3, the hybrid controlling portion 52 increases the electric motor rotation speed NM1 while keeping the second electric motor rotation speed NM2 that is restricted by the vehicle speed V (i.e., the speed of the driving wheels 38) substantially constant when increasing the engine speed NE while the vehicle is running.

A switch controlling portion 50 selectively switches the shift state between the continuously variable shift state, i.e., the differential state, and the stepped shift state, i.e., the locked state, by switching the state of an apply device used for switching (i.e., the switching clutch C0 or the switching brake B0) between being applied and released based on the vehicle state. For example, the switch controlling portion 50 determines whether the vehicle is in i) a continuously variable region where the shift mechanism 10 is placed in the continuously variable shift state or ii) in a stepped region where the shift mechanism 10 is placed in the stepped shift state, based on whether the vehicle state as indicated by the required output shaft torque TOUT and the vehicle speed V is within the continuously variable region or the stepped region in the map shown in FIG. 6 that was stored in advance in the storing portion 56. Then the switch controlling portion 50 selectively switches the shift mechanism 10 to either the continuously variable shift state or the stepped shift state by switching between applying the switching clutch C0 or the switching brake B0 and releasing the switching clutch C0 and the switching brake B0.

That is, when it is determined that the vehicle is in the stepped shift control region, the switch controlling portion 50 outputs a signal that does not allow, i.e., prohibits, hybrid control or continuously variable shift control to the hybrid controlling portion 52. At the same time, the switch controlling portion 50 outputs a signal that allows a shift at the time of a stepped shift that was set in advance to the stepped shift controlling portion 54, and applies the switching clutch C0 or the switching brake B0 according to the shift determination by that stepped shift controlling portion 54. The stepped shift controlling portion 54 at this time executes forward seven speed automatic shift control of the automatic shifting portion 20 according to the shift line graph shown in FIG. 6, for example, that was stored in advance in the storing portion 56. The clutch and brake application chart in FIG. 2 that was stored in advance in the storing portion 56 shows the combinations of the hydraulic friction apply devices, i.e., C0, C1, C2, C3, B1, and B2, that may be selectively operated for the shift at this time. That is, the entire shift mechanism 10, i.e., the differential portion 11 and the automatic shifting portion 20, functions as a so-called stepped automatic transmission and establishes a gear according to the clutch and brake application chart shown in FIG. 2.

However, when it has been determined that the vehicle state as indicated by the required output shaft torque TOUT and the vehicle speed V is in the continuously variable region in FIG. 6, the switch controlling portion 50 outputs a command to the hydraulic control circuit 42 to release both the switching clutch C0 and the switching brake B0 so that the differential portion 11 is able to shift continuously in the continuously variable shift state in order to have the overall shift mechanism 10 be in a continuously variable shift state. At the same time, the switch controlling portion 50 also outputs a signal to the hybrid controlling portion 52 to allow hybrid control, as well as outputs to the stepped shift controlling portion 54 either a signal to fix (i.e., make constant) the gear during continuously variable shifting at a gear that was set in advance, or a signal to allow the automatic shifting portion 20 to shift automatically according to the shift line graph shown in FIG. 6, for example, which was stored in the storing portion 56 in advance. In this case, the stepped shift controlling portion 54 controls the automatic shifting portion 20 to automatically shift into one of four forward gears that exclude the application of the switching clutch C0 and the switching brake B0 in the clutch and brake application chart shown in FIG. 2. Those four forward gears are i) first gear (speed ratio $\gamma A=3.683$) that is established by applying the first clutch C1 and the second brake B2, ii) second gear (speed ratio $\gamma A=1.909$) that is established by applying the first clutch C1 and the first brake B1, iii) third gear (speed ratio $\gamma A=1.000$) that is established by applying the first clutch C1 and the third clutch C3, and iv) fourth gear (speed ratio $\gamma A=0.661$) that is established by applying the third clutch C3 and the first brake B1. In this way, by having the differential portion 11 that was switched to the continuously variable shift state by the switch controlling portion 50 function as a continuously variable transmission and having the in-line automatic shifting portion 20 function as a stepped transmission, the appropriate amount of driving force can be obtained while a continuous speed ratio width can be obtained for each gear by changing the rotation speed input to the automatic shifting portion 20, i.e., the rotation speed of the transmitting member 18, continuously (i.e., in a stepless manner) for first through fourth gear in the automatic shifting portion 20. Accordingly, the intervals between those gears are speed ratios that can be changed continuously (i.e., in a stepless manner) such that the overall shift mechanism 10 is placed in a continuously variable shift state so the total speed ratio $\gamma T$ can be obtained continuously.

Incidentally, FIG. 6 is one example of a shift line graph (relationship, shift map) which is stored in advance in the storing portion 56 and provides the basis for the shift determinations of the automatic shifting portion 20. This shift line graph is formed by a two-dimensional coordinate system having the vehicle speed V and the required output torque TOUT, which is a value related to the driving force, as parameters. The solid lines in FIG. 6 are upshift lines and the alternate long and short dashes lines are downshift lines. The broken line in FIG. 6 represents a determining vehicle speed V1 and a determining output torque TOUT1 for making a determination to switch from the continuously variable control region to the stepped control region by the switch controlling portion 50. That is, the broke line in FIG. 6 includes both a high vehicle speed determination line and a high output running determination line. The high vehicle speed determination line defines a range of the determining vehicle speed V1 which is a high speed running determining value that is set in advance and used to determine the high speed running region of the hybrid vehicle. The high output running determination line defines a range of the determining output torque TOUT1 which is a value related to the driving force which is related to the required driving force of the hybrid vehicle, e.g., which is a high output running determining value that is set in advance and used to determine the high torque running region and high output running region in which the output torque TOUT of the automatic shifting portion 20 becomes high output. Moreover, there is hysteresis in the determination between the stepped control region and the continuously variable control region, as shown by the alternate long and two short dashes line with respect to the broken line in FIG. 6.

That is, FIG. 6 is a switching line graph (i.e., switching map, relationship) which includes the determining vehicle speed V1 and the determining output torque TOUT1 and has the vehicle speed V and the output torque TOUT as parameters, and which is stored in advance to help the switch controlling portion 50 determine whether the vehicle is in the stepped control region or the continuously variable control region. Incidentally, this switching line graph may also be stored in advance in the storing portion 56 as a shift map. Also, this switching line graph may include at least one of the determining vehicle speed V and the determining output torque TOUT1, or may include a switching line with either the vehicle speed V or the output torque TOUT stored in advance as the parameter.

The shift line graph, the switching ling graph, or the driving power source switching line graph or the like may be stored as a determination expression for comparing the actual vehicle speed V and the determining vehicle speed V1 or a determination expression for comparing the output torque TOUT and the determining output torque TOUT1 instead of as a map. For example, in this case, the switch controlling portion 50 determines whether, for example, the actual vehicle speed V (i.e., a value indicative of the vehicle state) has exceeded the determining vehicle speed V1, and if so, applies the switching clutch C0 or the switching brake B0 to place the shift mechanism 10 in a stepped shift state. Also, the switch controlling portion 50 determines whether, for example, the output torque TOUT (i.e., another value indicative of the vehicle state) of the automatic shifting portion 20 has exceeded the determining output torque TOUT1, and if so, applies the switching clutch C0 or the switching brake B0 to place the shift mechanism 10 in a stepped shift state.

The vertical axis in FIG. 6 represents the output shaft torque TOUT but is not limited to this as long as it represents a value related to the required driving force. A value related to the required driving force is a parameter that corresponds 1 to 1 with the required driving force of the vehicle, and is a required value of not only the required drive torque or the driving force at the driving wheels 38, but also the required output torque TOUT of the automatic shifting portion 20, the required engine torque TE, or the required vehicle acceleration G, or the engine torque that is calculated based on, for example, the acceleration depression amount θACC or the throttle valve opening amount θTH (or the intake air amount, the air-fuel ratio, or the fuel injection quantity) and the engine speed NE, for example. Also, the driving torque may be calculated taking into account the differential ratio from the output torque TOUT or the like and the radius of the driving wheels 38, for example. Alternatively, the driving torque may be directly detected using a torque sensor or the like. The same also applies to other torque as well.

Also, the determining vehicle speed V1 is set, for example, so that the shift mechanism 10 is placed in the stepped shift state during high speed running in order to suppress a decrease in fuel efficiency which would occur if the shift mechanism 10 were in the continuously variable shift state during high speed running. Also, the determining torque TOUT1 is set, for example, according to the characteristics of the first electric motor M1 in which the maximum output of electric energy from that first electric motor M1 can be reduced in order to reduce the size of the first electric motor M1 by not making it provide reaction torque all the way up to the high output region of the engine when the vehicle is running at high output.

As shown by the relationships in FIG. 6, the high torque region where the output torque TOUT is equal to or greater than the determining output torque TOUT1 that was set in advance, or the high vehicle speed region where the vehicle speed V is equal to or greater than the determining vehicle speed V1 that was set in advance is set as the stepped control region. Therefore, stepped shift running is performed when the driving torque of the engine 8 is relatively high or when the vehicle speed is relatively high. On the other hand, continuously variable shift running is performed when the driving torque of the engine 8 is relatively low or when the vehicle speed is relatively low, i.e., in the normal output region of the engine 8.

Accordingly, for example, when the vehicle is running at low or mid speeds and at low or medium output, the shift mechanism 10 is placed in a continuously variable shift state to ensure fuel efficiency performance of the vehicle. However, because the automatic shifting portion 20 functions as a four-speed transmission, the maximum value of the electric energy to be generated by the first electric motor M1, i.e., the maximum value of the electric energy that the first electric motor M1 transmits, can be reduced which enables the first electric motor M1 or the vehicular power transmitting apparatus that includes that first electric motor M1 to be further reduced in size. In contrast, when the vehicle is running at high speeds in which the vehicle speed V exceeds the determining vehicle speed V1 or at high output in which the output torque TOUT exceeds the determining torque TOUT1, the shift mechanism 10 is placed in a stepped shift state in which it operates as a stepped transmission and output from the engine 8 is transmitted to the driving wheels 38 entirely along a mechanical power transmitting path so conversion loss between power and electric energy that occurs when the shift mechanism 10 operates as an electric continuously variable transmission is suppressed so fuel efficiency is improved.

Figure 7:
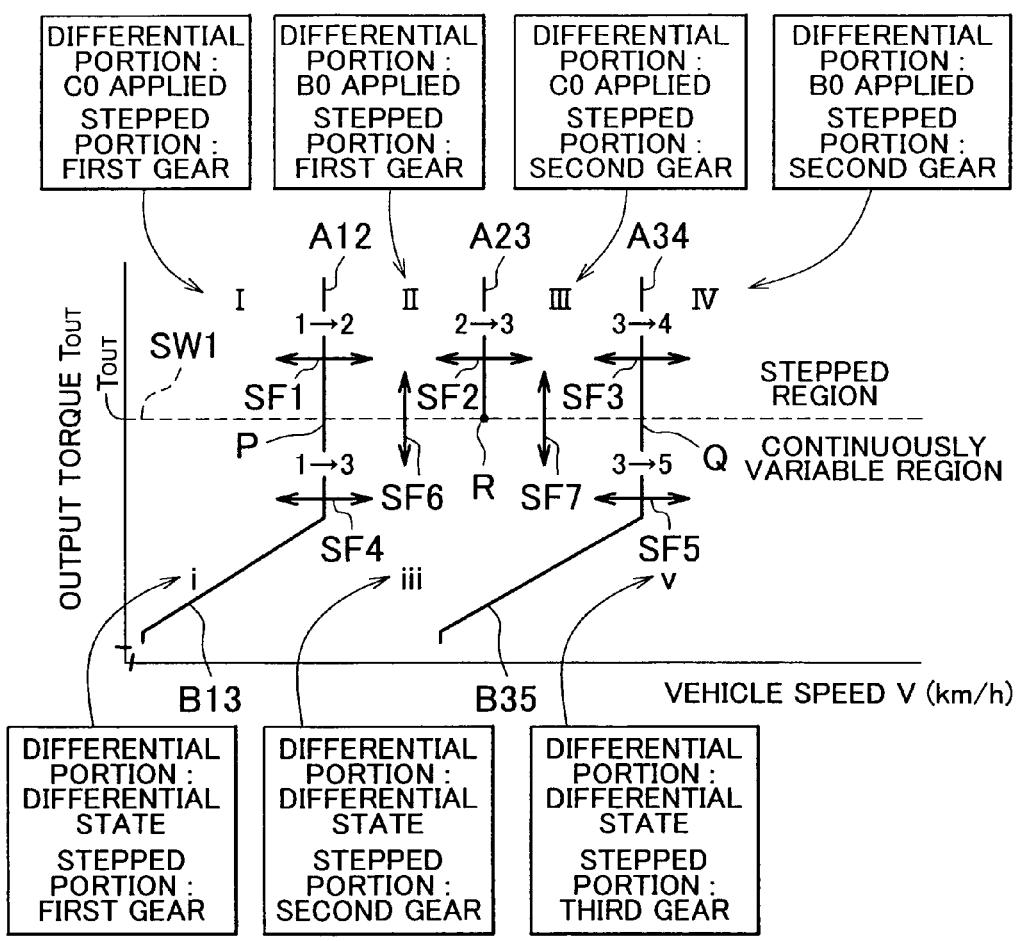
FIG. 7 is an enlarged view of a portion of FIG. 6, which illustrates parts of the shift line graph and the switching line graph shown in FIG. 6.

FIG. 7 is a view showing a portion of the shift line graph in FIG. 6 enlarged in order to show the details of a shift based on that shift line graph. To simplify the description in FIG. 7, the upshift lines that are shown by the solid lines in FIG. 6 and downshift lines that are shown by the alternate long and short dashes lines in FIG. 6 are overlapped and shown by a single solid line in FIG. 7. Also, the switching line from the continuously variable region to the stepped region that is shown by the broken line in FIG. 6, and the switching line from the stepped region to the continuously variable region that is shown by the alternate long and two short dashes line in FIG. 6 are overlapped and shown by a single broken line SW1 in FIG. 7. In FIG. 7, the stepped region is above the switching line shown by the broken line SW1 and the continuously variable region is below that switching line. In the stepped region, shift lines A12, A23, and A34 for stepped operation (hereinafter simply referred to as "stepped shift lines") are provided for executing shifts of the overall power transmitting apparatus. Also, gear (i.e., gear speed) regions for stepped operation (hereinafter simply referred to as "stepped gear regions") that are defined by both those stepped shift lines A12, A23, and A34 and the switching line are provided as shown by upper case roman numerals I, II, III, and IV in that order from the low vehicle speed side (i.e., from the left side in the drawing). The shift state in the stepped gear region I uses the differential portion 11 which has been placed in a non-differential state with the switching clutch C0 applied, and first gear (i.e., the lowest gear) of the automatic shifting portion 20. Hereinafter this shift state will be referred to as "stepped 1st gear". The shift state in the stepped gear region II uses the differential portion 11 which has been placed in a non-differential state with the switching brake B0 applied, and first gear of the automatic shifting portion 20. Hereinafter this shift state will be referred to as "stepped 2nd gear". The shift state in the stepped gear region III uses the differential portion 11 which has been placed in the non-differential state with the switching clutch C0 applied, and second gear (i.e., the second lowest gear) of the automatic shifting portion 20. Hereinafter this shift state will be referred to as "stepped 3rd gear". The shift state in the stepped gear region IV uses the differential portion 11 which has been placed in the non-differential state with the switching brake B0 applied, and second gear of the automatic shifting portion 20. Hereinafter this shift state will be referred to as "stepped 4th gear". These shift states are all shown in FIG. 2. Incidentally, as described above, in FIG. 7 both the switch from the stepped region to the continuously variable region and the switch from the continuously variable region to the stepped region are shown by a single switching line. However, the invention may also be applied in the same way when there is hysteresis between the switching line used for switching from the stepped region to the continuously variable region (i.e., the alternate long and two short dashes line) and the switching line used for switching from the continuously variable region to the stepped region (i.e., the broke line), as shown in FIG. 6. Also, in FIG. 7 the upshift lines and the downshift lines are shown by the same line. However, the invention may also be applied in the same way when the upshift lines and the downshift lines are defined separately, as shown in FIG. 6. Incidentally, the stepped 1st gear to the stepped 4th gear correspond to 1st to 4th in the clutch and brake application chart shown in FIG. 2. Also, although not shown in FIG. 7, stepped 5th gear to stepped 7th gear which correspond to 5th to 7th in the clutch and brake application chart shown in FIG. 2 may also be defined in the same way.

Meanwhile, in the continuously variable region below the switching line SW1, shift lines B13 and B35 for continuously variable operation (hereinafter simply referred to as "continuously variable shift lines") are provided for executing shifts in the automatic shifting portion 20. Also, gear (i.e., gear speed) regions for continuously variable operation (hereinafter simply referred to as "continuously variable gear regions") that are defined by both those continuously variable shift lines B13 and B35 and the switching line SW1 are provided as shown by lower case roman numerals i, iii, and v in that order from the low vehicle speed side (i.e., from the left side in the drawing). The shift state in the continuously variable shift region i uses the differential portion 11 which has been placed in a differential state with both the switching clutch C0 and the switching brake B0 released, and first gear of the automatic shifting portion 20. Hereinafter this shift state will be referred to as "continuously variable 1st gear". The shift state in the continuously variable gear region iii uses the differential portion 11 which has been placed in the differential state, and second gear of the automatic shifting portion 20. Hereinafter this shift state will be referred to as "continuously variable 2nd gear". The shift state in the continuously variable gear region v uses the differential portion 11, which has been placed in the differential state, and third gear of the automatic shifting portion 20. Hereinafter this shift state will be referred to as "continuously variable 3rd gear". Incidentally, although not shown in FIG. 7, continuously variable 7th gear may also be defined in the same way.

Incidentally, in the drawing, the switching line SW1 corresponds to a first control map, the continuously variable shift lines B13 and B35 correspond to a second command map, and the stepped shift lines A12, A23, and A34 correspond to a third control map.

In this way, a shift determination is made and a shift is executed when a transition from one of these regions to another is made, i.e., when the trajectory of the operating state of the vehicle represented by a point in the planar coordinate system in FIG. 7 crosses the switching line SW1, one of the continuously variable shift lines B13 or B35, or one of the stepped shift lines A12, A23, or A34. Here, looking at the continuously variable gear region iii, for example, shifts from the continuously variable gear region iii and shifts into the continuously variable gear region iii are represented by the arrows SF4 to SF7 in the drawing. That is, shift SF1 represents a shift between the stepped gear region I and the stepped gear region II, shift SF2 represents a shift between the stepped gear region II and stepped gear region III, shift SF3 represents a shift between the stepped gear region III and the stepped gear region IV, shift SF4 represents a shift between the continuously variable gear region i and the continuously variable gear region iii, shift SF5 represents a shift between the continuously variable gear region iii and the continuously variable gear region v, shift SF6 represents a shift between the continuously variable gear region iii and the stepped gear region II, and shift SF7 represents a shift between the continuously variable gear region iii and the stepped gear region III.

At this time, stepped gear regions II and III are the stepped gear regions that contact the continuously variable gear region iii via the switching line. The gears of the automatic shifting portion 20 used in these regions are as follows: second gear is used in the continuously variable gear region iii, first gear which is adjacent to second gear is used in the stepped gear region II, and second gear is used in the stepped gear region III. Therefore, in the shift SF6 from the continuously variable gear region iii to the stepped gear region II, the automatic shifting portion 20 is downshifted from second gear to first gear. In the shift SF7 from the continuously variable gear region iii to the stepped gear region III, the automatic shifting portion 20 is kept in second gear. In this way, in the continuously variable gear region and the stepped gear region that contacts that continuously variable gear region via the switching line, the automatic shifting portion 20 uses either the same gear or an adjacent gear.

In other words, when a shift is performed with a switch between the differential state and the non-differential state in the differential portion 11, the automatic shifting portion 20 is either kept in the same gear or shifted into an adjacent gear.

Also, when looking at shift SF2 which is a shift between the stepped gear region II and the stepped gear region III, the shift SF2 is a shift from stepped 2nd gear to stepped 3rd gear. Therefore, according to the clutch and brake application chart shown in FIG. 2, the shift SF2 is a so-called simultaneous shift in which both release of the switching brake B0 and application of the switching clutch C0 in the differential portion 11 and the shift from first gear to second gear in the automatic shifting portion 20 are executed simultaneously, and which changes the total speed ratio. That is, the stepped shift line changes the state of the differential portion 11 between the differential state and the non-differential state and also executes a simultaneous shift that changes the gear of the automatic shifting portion 20. Incidentally, according to the clutch and brake application chart in FIG. 2, in the shift SF1 between the stepped gear region I and the stepped gear region II and the shift SF3 between the stepped gear region III and the stepped gear region IV, a change is only made between different non-differential states by changing the application or release state of the switching clutch C0 and the switching brake B0 of the differential portion 11, while maintaining the gear of the automatic shifting portion 20. Therefore, the shifts SF1 and SF3 are not simultaneous shifts.

Here, in the stepped region, the order of the gears that are shifted into as the vehicle speed increases is, in order from the lowest vehicle speed, stepped 1st gear, stepped 2nd gear, stepped 3rd gear, stepped 4th gear, stepped 5th gear, stepped 6th gear, and stepped 7th gear. The gears of the automatic shifting portion 20 that are used in these gears are first gear, first gear, second gear, second gear, third gear, fourth gear, and fourth gear, respectively. Meanwhile, in the continuously variable region, the order of the gears that are shifted into as the vehicle speed increases is, in order from the low vehicle speed, continuously variable 1st gear, continuously variable 3rd gear, continuously variable 5th gear, and continuously variable 7th gear. The gears of the automatic shifting portion 20 that are used in these gears are first gear, second gear, third gear, and fourth gear, respectively. Incidentally, although not shown in FIG. 7, stepped 5th gear through stepped 7th gear, and continuously variable 7th gear are derived according to the shift line graph in FIG. 6 and the clutch and brake application chart in FIG. 2. In this way, the order of the gears when the automatic shifting portion 20 shifts as the vehicle speed changes when the differential portion 11 is in a non-differential state, and the order of the gears when the automatic shifting portion 20 shifts as the vehicle speed changes when the differential portion 11 is in a differential state are the same, i.e., first gear, second gear, third gear, and fourth gear.

Also, in the shift SF2 that represents a shift with both a switch between non-differential states in the differential portion 11 and a shift in the automatic shifting portion 20, the automatic shifting portion 20 is shifted from first gear to second gear. Accordingly, the higher gear from among the gears of the automatic shifting portion 20 before and after the shift is second gear, and the continuously variable gear region using this second gear is the continuously variable gear region iii. At this time, the point of intersection R of the switching line SW1 and the stepped shift line A23 corresponding to the shift SF2 is positioned between the point of intersection P of the continuously variable shift line B13 and the switching line SW1 which define the continuously variable gear region iii and the point of intersection Q of the continuously variable shift line B35 and the switching line SW1. At this time, as a shift when the differential state in the differential portion 11 is switched to the non-differential state from the continuously variable gear region iii, in addition to the shift SF6 in which the switch between the differential state and the non-differential state in the differential portion 11 and the change in the gear of the automatic shifting portion 20 are executed simultaneously (hereinafter this kind of a shift will be referred to as a "simultaneous shift"), the shift SF7 is set in which only the switch between the differential state and the non-differential state in the differential portion 11 is performed and gear of the automatic shifting portion 20 is not changed. That is, a shift between the continuously variable gear region and the stepped gear region can be executed by only switching the differential portion 11 between the differential state and the non-differential state.

In other words, the shift point vehicle speed for switching the total speed ratio γT by simultaneously switching between different non-differential states in the differential portion 11 and executing a shift in the automatic shifting portion 20 is set within a vehicle speed range that has been set so that the vehicle runs in a vehicle state in which an attempt is made to switch the differential portion 11 from the differential state to a non-differential state using a combination of the automatic shifting portion 20 that uses the same gear as the higher gear from among the gears before and after the shift in the automatic shifting portion 20, and the differential portion 11 that has been placed in the differential state.

Also, the shifts SF4 and SF5 which correspond to the trajectory of the point indicative of the operating state of the vehicle in the shift line graph crossing the continuously variable shift lines B13 and B35, respectively, specify only shifts in the automatic shifting portion 20 in the power transmitting apparatus that operates as a continuously variable transmission overall. That is, in the shifts SF4 and SF5, the automatic shifting portion 20 executes only shifts that are already determined by the continuously variable shift lines B13 and B35, respectively, while the differential portion 11 in the differential state executes, for example, a shift in the opposite direction of the shift in the automatic shifting portion 20 at the same time, or substantially the same time, as that shift in the automatic shifting portion 20 so that the total speed ratio γT of the overall power transmitting apparatus changes continuously instead of in a stepped manner even if the speed ratio of the automatic shifting portion 20 changes in a stepped manner due to the shift in the automatic shifting portion 20. Accordingly, the number of continuously variable shift lines that specify only a shift in the automatic shifting portion 20 will not be greater than the number of stepped shift lines that specify a switch between non-differential states in the differential portion 11 in addition to a shift in the automatic shifting portion 20.

In other words, a switchable stepped gear region exists on the side of a predetermined continuously variable gear region where the output torque is large (i.e., on the upper side in the drawing), by only switching the differential portion 11 from a non-differential state to a differential state without executing a shift in the automatic shifting portion 20. Therefore, when a command is output to the vehicular power transmitting apparatus 10 to change the output or output torque, the same gear is maintained in the automatic shifting portion 20 regardless of whether there is a change between the differential state and the non-differential state in the differential portion 11.

Also, according to FIG. 7, the gear in the automatic shifting portion 20 that is used in the continuously variable gear region iii is second gear, while the gears in the automatic shifting portion 20 that are used in the stepped gear regions II and III that contact the continuously variable gear region iii via the switching line are first gear and second gear, respectively. That is, if a command is output to increase the output or output torque when the running state of the vehicle indicated by the dot in FIG. 7 is in the continuously variable gear region iii, either shift SF6 or shift SF7 is executed but the automatic shifting portion 20 will not upshift because of that shift. Conversely, if a command is output to reduce the output or output torque when the running state of the vehicle indicated by the dot in FIG. 7 is in the continuously variable gear region iii, either shift SF6 or shift SF7 is executed but the automatic shifting portion 20 will not downshift because of that shift. In this way, the automatic shifting portion 20 will neither upshift depending on the shift when a command to increase the output or output torque is output, nor downshift depending on the shift when a command to decrease the output or output torque is output.

In other words, the differential portion 11 is switched between the differential state and the non-differential state or a shift is executed in the automatic shifting portion 20 in addition to, and simultaneously with, that switch so that the engine speed NE will not decrease when a command has been output to the vehicular power transmitting apparatus to increase the output or output torque, as well as so the engine speed NE will not increase when a command has been output to the vehicular power transmitting apparatus to decrease the output or output torque.

Incidentally, only some of the regions in FIG. 6 have been described with reference to FIG. 7. Descriptions of the other regions in FIG. 6 are similar and so will be omitted here.

Figure 8:
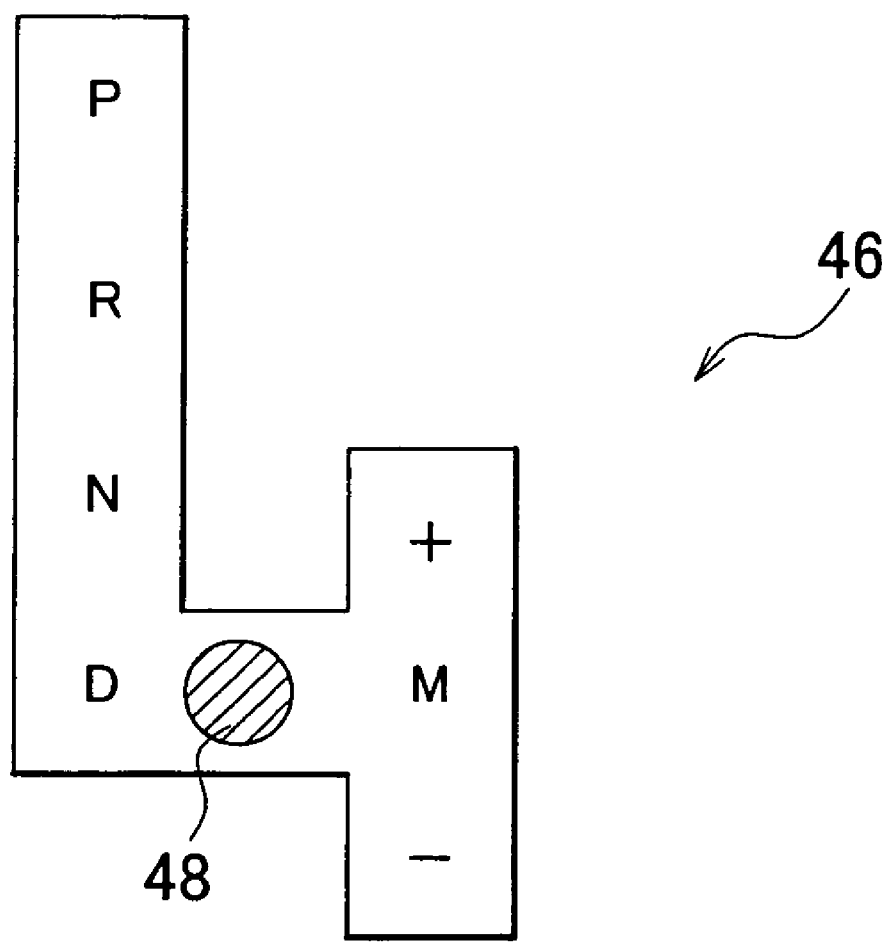
FIG. 8 is an example of a shift operation executing apparatus provided with a shift lever that is operated to select any of a plurality of various shift positions.

FIG. 8 is a view of one example of a switching apparatus 46 that is operated by a person in order to switch among a plurality of various shift positions. This switching apparatus 46 is provided with a shift lever 48 that is arranged at the side of the driver's seat, for example, and is operated to select any one of the plurality of various shift positions. This shift lever 48 is provided so as to be manually operated (i.e., shifted) into various positions. These positions include a park position "P", a reverse position "R", a neutral position "N", a drive position "D", and a manual shift position "M". Shifting the shift lever 48 into the park position "P" places the shift mechanism 10, i.e., the automatic shifting portion 20, in a neutral state in which the power transmitting path therein is interrupted by neither the first clutch C1 nor the second clutch C2 being applied, and locks the output shaft 22 of the automatic shifting portion 20. The reverse position "R" is used for running the vehicle is reverse. Shifting the shift lever 48 into the neutral position "N" places the shift mechanism 10 in a neutral state in which the power transmitting path therein is interrupted. The drive position "D" is used to perform forward shifts automatically while running. The manual shift position "M" is used to perform forward shifts manually while running.

For example, when the shift lever 48 is shifted (i.e., operated) into the "D" position, various controls are executed based on the switching map and the shift map shown in FIG. 6 that are stored in advance. More specifically, automatic switching control of the shift state in the shift mechanism 10 is executed by the switch controlling portion 50, continuously variable shift control of the power split device 16 is executed by the hybrid controlling portion 52, and automatic shift control of the automatic shifting portion 20 is executed by the stepped shift controlling portion 54. This "D" position is also a shift position that selects an automatic shift running mode (i.e., automatic mode) which is a control mode in which automatic shift control of the shift mechanism 10 is executed.

When the shift lever 48 is shifted into the "M" position, the shift mechanism 10 switches to the stepped shift state, the shift mechanism 10 is controlled to shift automatically in steps within a range up to the highest specified gear or is controlled to shift automatically to establish a specified gear. This "M" position is also a shift position that selects a manual shift running mode (i.e., manual mode) which is a control mode in which manual shift control of the shift mechanism 10 is executed.

Incidentally, the shift mechanism 10 in this example embodiment is controlled into one of seven forward gears in order to achieve a wide speed ratio width and a close ratio, as shown in FIG. 2. Therefore, as described above, the shift between second gear and third gear and the shift between fourth gear and fifth gear are defined as simultaneous shifts because in these shifts a downshift in one of the differential portion 11 and the automatic shifting portion 20 is simultaneously executed with an upshift in the other. However, the engine speed NE changes in the opposite direction from these shifts, i.e., the engine speed NE increases from the downshift in one and simultaneously decreases from the upshift in the other, so in this case, even a slight difference in timing would result in an increase or decrease in engine speed that may be felt as shift shock by the occupants, which is undesirable. Therefore, as shown in FIG. 5, when a simultaneous shift is performed when it is determined by the switch controlling portion 50 that the shift mechanism 10 is in the stepped shift state, the stepped shift controlling portion 54 in this example embodiment executes the shift in the differential portion 11 simultaneously with the shift in the automatic shifting portion 20, and control is executed in which the stepped shift of the differential portion 11 is started and ended within the inertia phase of that stepped shift of the automatic shifting portion 20.

That is, the stepped shift controlling portion 54 is provided with a simultaneous shift determining portion 62, a second shift controlling portion 64, an inertia phase determining portion 66, and a first shift controlling portion 68. The simultaneous shift determining portion 62 determines whether a simultaneous shift will be executed based on the vehicle state as indicated by the vehicle speed V and the required output torque TOUT from the relationship shown in FIG. 6. If the simultaneous shift determining portion 62 determines that simultaneous shift will be executed, the second shift controlling portion 64 first executes a clutch-to-clutch shift in the automatic shifting portion 20 in order to realize that simultaneous shift. The inertia phase determining portion 66 determines the start of the inertia phase as a result of the clutch-to-clutch shift in the automatic shifting portion 20 based on, for example, a change in the engine speed NE. When the inertia phase determining portion 66 determines inertia phase, the first shift controlling portion 68 outputs a command to the hydraulic pressure control circuit 42, either directly or via the switch controlling portion 50, to start and end the clutch-to-clutch shift in the differential portion 11 in order to realize the simultaneous shift within the inertia phase, i.e., within the period during which the engine speed NE changes. The stepped shift controlling portion 54 controls the apply pressure of the friction apply devices and the timing of the clutch-to-clutch shift by the second shift controlling portion 64 as well as the clutch-to-clutch shift by the first shift controlling portion 68 so that change in the engine speed NE during the inertia phase is in the same direction.

When the inertia phase has been determined by the inertia phase determining portion 66, engine output reducing portion 70 temporarily reduces the output of the engine 8, preferably in the same period as the inertia phase, using the engine output control apparatus 43 via the hybrid controlling portion 52 in order to further suppress shift shock caused by the simultaneous shift. When the inertia phase has been determined by the inertia phase determining portion 66, a first electric motor rotation speed controlling portion 72 controls the rotation speed NM1 of the first electric motor M1 according to the change in the input rotation speed of the second transmitting portion (i.e., the rotation speed of the transmitting member 18) in order to further suppress shift shock caused by the simultaneous shift. The first electric motor rotation speed controlling portion 72 also controls the rotation speed NM1 of the first electric motor M1 via the hybrid controlling portion 52 so that the change in the engine speed within the inertia phase is in the same direction.

Figure 9:
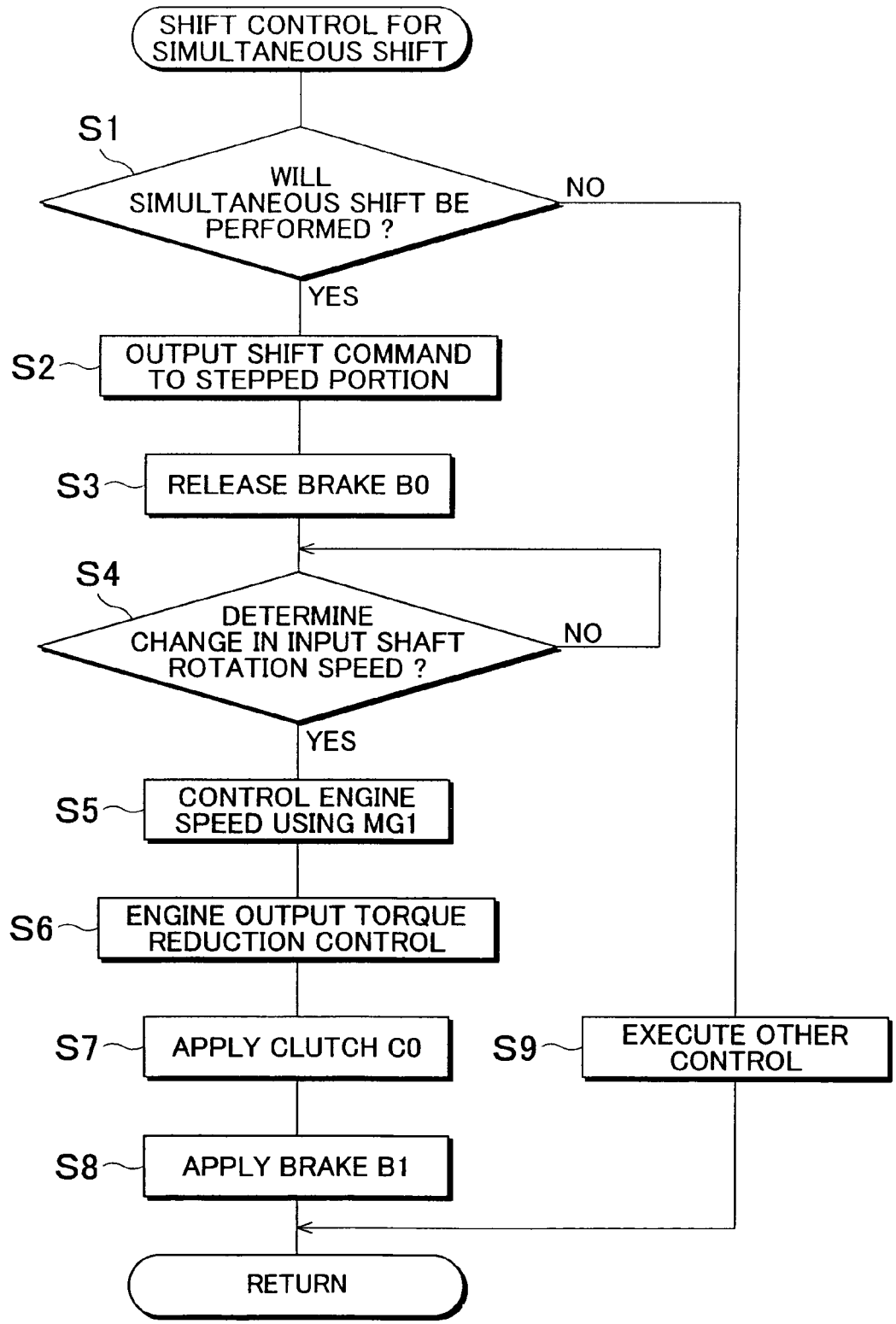
FIG. 9 is a flowchart illustrating the main portion of a control operation of the electronic control apparatus shown in FIG. 4, i.e., a control operation that executes a simultaneous shift.

FIG. 9 is a flowchart illustrating the main portion of a control operation of the electronic control apparatus 40, i.e., a shift control operation for controlling the simultaneous shift in the stepped shift state. The routine in this flowchart is repeatedly executed at predetermined cycles.

Figure 10:
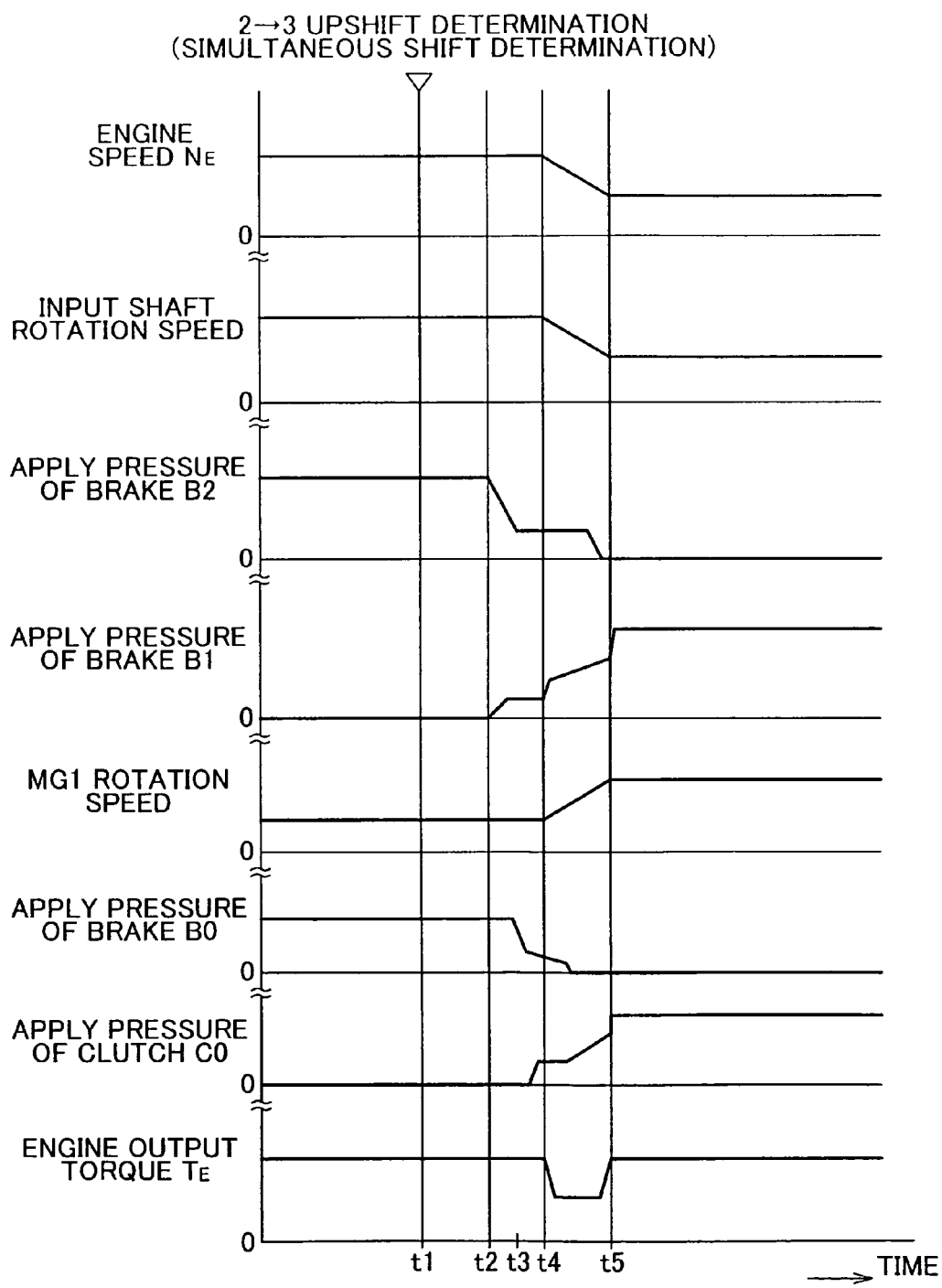
FIG. 10 is a time chart showing the control operation in FIG. 9.

First, in step S1 which corresponds to the simultaneous shift determining portion 62, it is determined whether a simultaneous shift will be executed. If the determination in step S1 is no, then other control is executed in step S9. If, on the other hand, the determination is yes, as is shown at time t1 in FIG. 10, then next in step S2 which corresponds to the second shift controlling portion 64, a shift command is first output to the automatic shifting portion 20 (i.e., the second transmitting portion) to realize the simultaneous shift and brake B2 is first released. This state is shown at time t2 in FIG. 10. That is, when the simultaneous shift is an upshift from second gear to third gear, for example, first the hydraulic pressure starts to be changed to start releasing the brake B2 which is the hydraulic friction apply element on the release side while simultaneously starting to change the hydraulic pressure to apply the brake B1 which is the hydraulic friction apply element on the apply side. Next, in step S3 which corresponds to the first gear controlling portion 68, in order to start the clutch-to-clutch shift in the differential portion 11 during the inertia phase of the clutch-to-clutch shift that is achieved by releasing the brake B2 and applying the brake B1, a command is output to release the switching brake B0 and a command is output to have the switching clutch C0 standby to be applied before that inertia phase starts. This state is shown at time t3 in FIG. 10.

Next, in step S4 which corresponds to the inertia phase determining portion 66, the start of the inertia phase is determined based on when the engine speed NE starts to decrease due to the brake B2 being released. This state is shown at time t4 in FIG. 10. Then in step S5 which corresponds to the engine output reducing portion 70, the engine output is temporarily reduced by, for example, closing the electronic throttle valve 96 using the throttle actuator 97, reducing the amount of fuel injected by the fuel injection apparatus 98 according to fuel injection control, or retard the ignition timing by the ignition apparatus 99 such as an igniter according to ignition timing control. In step S6 which corresponds to the first electric motor rotation speed controlling portion 72, the rotation speed NM1 of the first electric motor M1 is controlled via the hybrid controlling portion 52 so that the change in the engine speed during the inertia phase is in the same direction and at a constant rate by controlling the rotation speed NM1 of the first electric motor M1 according to the change in the rotation speed of the transmitting member 18 in order to further suppress shift shock caused by the simultaneous shift. For example, in a 2nd→3rd upshift, when the engine speed NE decreases (i.e., changes in the decrease direction) from the upshift in the automatic shifting portion 20 and increases (i.e., changes in the increase direction) from the downshift in the differential portion 11 that is executed at the same time, that increase in engine speed can be suppressed such that the change in the engine speed NE is uniform in the decrease direction by temporarily reducing the rotation speed of the first electric motor M1, i.e., of the sun gear S0, or temporarily making that rotation speed negative. Also, in step S7 which corresponds to the first shift controlling portion 68, the apply pressure of the switching clutch C0 is increased such that the switching clutch C0 starts to apply in order to end the clutch-to-clutch shift in the differential portion 11 during the inertia phase. Then, in step S8 which corresponds to the second shift controlling portion 64, the brake B1 starts to be applied The simultaneous shift is ends when the brake B1 is completely applied. This state is shown at time t5 in FIG. 10. Here, the timing and the apply pressures are controlled such that the direction in which the engine speed NE changes from the clutch-to-clutch shift control of the automatic shifting portion 20 according to steps S2 and S8, and the direction in which the engine speed NE changes from the clutch-to-clutch shift control of the differential portion 11 according to steps S3 and S7 are the same.

As described above, according to the electronic control apparatus 40 in this example embodiment, during a shift with a switch between the differential state and the non-differential state in the differential portion 11, the automatic shifting portion 20 is either maintained in the gear that it is in at that time or shifted into an adjacent gear. Therefore, during a shift with a switch between the differential state and the non-differential state in the differential portion 11, shift shock can be suppressed because a shift in which the gear is changed by two or more gears in the automatic shifting portion 20 is not executed.

Also, according to the electronic control apparatus 40 of this example embodiment, the differential portion 11 can switch between a plurality of non-differential states with different speed ratios. Also, when the differential portion 11 is in a non-differential state, the vehicular power transmitting apparatus 10 operates as a stepped transmission in which a plurality of different total speed ratios can be achieved as a vehicular power transmitting apparatus based on the speed ratio of the differential portion 11 in one selected non-differential state from among the plurality of non-differential states and the speed ratio of the gear that is set by the automatic shifting portion 20. Further, the vehicular power transmitting apparatus 10 executes a shift that changes the total speed ratio by simultaneously switching between the plurality of non-differential states of the differential portion 11 and executing a shift in the automatic shifting portion 20. Therefore, when the differential portion 11 is in a non-differential state, the differential portion 11 is switched between a plurality of non-differential states while at the same time a shift is executed in the automatic shifting portion automatic shifting portion 20, and a shift can be executed using the total speed ratio $\gamma T$ that is achieved by simultaneously switching between the plurality of non-differential states of the differential portion 11 and executing a shift in the automatic shifting portion 20. That is, the value that can be taken as the total speed ratio $\gamma T$ of the vehicular power transmitting apparatus 10 increases, thus enabling a close ratio to be realized.

Also, according to the electronic control apparatus 40 of this example embodiment, the order of the gears when the automatic shifting portion 20 is shifted as the vehicle speed changes when the differential portion 11 is in the non-differential state is the same as the order of the gears when the automatic shifting portion 20 is shifted as the vehicles speed changes when the differential portion 11 is in the differential state. Therefore, the shift in the automatic shifting portion 20 can be prevented from being a shift between gears that are far apart from one another when the differential portion 11 is switched between the non-differential state and the differential state.

Also, according to the electronic control apparatus 40 of this example embodiment, the shift point vehicle speed for switching the total speed ratio $\gamma T$ by simultaneously switching between different non-differential states in the differential portion 11 and executing a shift in the automatic shifting portion 20 is set within a vehicle speed range that was set so that the vehicle runs with the combination of the differential portion 11 in the differential state and the automatic shifting portion 20 that uses the same gear as the higher gear from among the gears before and after the shift in the automatic shifting portion 20. Therefore, during a shift with a switch between the differential state and the non-differential state in the differential portion 11, the automatic shifting portion 20 is either shifted into an adjacent gear or kept in the same gear after the switch as it was in before the switch. In this way, a shift in which the gear is changed by two or more gears is not executed so shift shock is able to be preferably suppressed or the automatic shifting portion 20 will no longer need to be shifted together with the change in the differential portion 11.

Also, according to the electronic control apparatus 40 in this example embodiment, when there is a demand for a change in the output or output torque of the vehicular power transmitting apparatus 10, the gear in the automatic shifting portion 20 is kept the same regardless of whether there is a switch between the differential state and the non-differential state of the differential portion 11. As a result, when there is a command to a change the output or output torque is output to the vehicular power transmitting apparatus 10, it is not necessary to execute a shift in the automatic shifting portion 20 so the operation can be simplified even when the differential portion 11 changes between the differential state and the non-differential state.

Also, according to the electronic control apparatus 40 of this example embodiment, when there is a demand for the vehicular power transmitting apparatus 10 to increase output or output torque, the differential portion 11 is switched between the differential state and the non-differential state or a shift is executed in the automatic shifting portion 20 in addition to, and simultaneously with, that switch so that the speed NE of the engine that supplies the driving force to the vehicle via the vehicular power transmitting apparatus 10 does not decrease. As a result, the driver will not feel the unpleasant sensation of the engine speed decreasing when he or she is demanding more output or output torque by depressing the accelerator, for example.

Also, according to the electronic control apparatus 40 of this example embodiment, when there is a demand for the vehicular power transmitting apparatus 10 to reduce the output or output torque, the differential portion 11 is switched between the differential state and the non-differential state or a shift is executed in the automatic shifting portion 20 in addition to, and simultaneously with, that switch so that the speed NE of the engine that supplies the driving force to the vehicle via the vehicular power transmitting apparatus 10 does not increase. As a result, the driver will not feel the unpleasant sensation of the engine speed not decreasing when he or she is demanding less output or output torque by returning (i.e., letting up on) the accelerator, for example.

Also, according to the electronic control apparatus 40 of this example embodiment, when the differential portion 11 is in the differential state, the differential portion 11 operates as an electric continuously variable transmission that controls the differential state of the input shaft rotation speed NIN and the output shaft rotation speed N18 by controlling the operating states of the electric motors M1 and M2 that are connected to the rotating elements RE2 and RE3, respectively, of the differential mechanism. Also, the vehicular power transmitting apparatus 10 operates as a continuously variable transmission that can continuously change the total speed ratio γT by combining the automatic shifting portion 20 and the differential portion 11 that is in the differential state. As a result, the vehicular power transmitting apparatus 10 is able to operate as an electric continuously variable transmission by placing the differential portion 11 in a non-differential state according to the operating states of the electric motors M1 and M2.

Also, according to the electronic control apparatus 40 of this example embodiment, when the first through the third control maps are superposed on one another, the gear used in the automatic shifting portion 20 is the same or an adjacent gear in i) a predetermined continuously variable gear region defined by being sandwiched between the switching line and a pair of continuously variable shift lines in the differential region, and ii) a predetermined stepped gear region defined by being sandwiched between the switching line and a pair of stepped shift lines in the adjacent non-differential region which is separated by the switching line. Therefore, during a shift with a switch between the differential state and the non-differential state in the differential portion 11, a shift in which the gear is changed by two or more gears is not executed in the automatic shifting portion 20, thereby enabling shift shock to be suppressed.

Also, according to the electronic control apparatus 40 of this example embodiment, the stepped shift lines in the third control map include a portion for simultaneously or substantially simultaneously switching between a plurality of non-differential states in the differential portion 11 and executing a shift in the automatic shifting portion 20. Accordingly, a shift can be executed using the total speed ratio that is achieved by simultaneously switching between the plurality of non-differential states in the differential portion 11 and executing a shift in the automatic shifting portion 20.

Also, according to the electronic control apparatus 40 of this example embodiment, the point of intersection (e.g., point R in FIG. 7) of a switching line (e.g., SW1 in FIG. 7) in the first control map and a stepped shift line (e.g., line A23 in FIG. 7) that is associated with both a shift in the automatic shifting portion 20 and a switch among the plurality of non-differential states in the differential portion 11, from among the plurality of stepped shift lines in the third control map, is positioned between i) a point of intersection (e.g., point P in FIG. 7) of a switching line (e.g., SW1 in FIG. 7) in the first control map and a first continuously variable shift line (e.g., line B13 in FIG. 7) that represents a shift between a) a predetermined gear (for example, continuously variable 3rd gear that uses second gear which is also used in stepped 3rd gear) which is the higher gear of the gears before and after the shift in the automatic shifting portion 20 according to the stepped shift line with both the shift in the automatic shifting portion 20 and the switch among the plurality of non-differential states in the differential portion 11, among the plurality of continuously variable shift lines in the second map, and b) a gear (e.g., continuously variable 1st gear that uses first gear in FIG. 7) that is adjacent to, on the lower gear side of, that predetermined gear, and ii) a point of intersection (e.g., point Q in FIG. 7) of a switching line (e.g., SW1 in FIG. 7) in the first control map and a second continuously variable shift line (e.g., line B35 in FIG. 7) that represents a shift between the predetermined gear and a gear (e.g., continuously variable 5th gear that uses third gear in FIG. 7) that is adjacent to, on the higher gear side of, that predetermined gear. Accordingly, during a shift with a switch between the differential state and the non-differential state in the differential portion 11, the automatic shifting portion 20 is either shifted into an adjacent gear or kept in the same gear after the switch as it was in before the switch. In this way, a shift in which the gear is changed by two or more gears is not executed so shift shock is able to be preferably suppressed or the automatic shifting portion 20 will no longer need to be shifted together with the change in the differential portion 11.

Also, according to the electronic control apparatus 40 of this example embodiment, the continuously variable shift line in the second control map defines only the shift in the stepped shifting portion. Therefore, when a switch is made from the continuously variable shift region to the stepped shift region, the switch can be made by only switching the differential portion 11 from the differential state to the non-differential state without executing a shift in the stepped shifting portion.

Also, according to the electronic control apparatus 40 of this example embodiment, when the first, second, and third control maps are superposed on one another, in the predetermined continuously variable gear region, the gear used in the automatic shifting portion 20 is the same or the next higher gear as the gear used in the stepped gear region that is adjacent to the predetermined continuously variable gear region across the switching line. Therefore, the engine speed will neither decrease as a result of a switch from the continuously variable shift region to the stepped shift region that is made in response to a demand for more required torque, nor increase as a result of a switch from the stepped shift region to the continuously variable shift region that is made in response to a demand for less required torque. As a result, a change in the engine speed that conflicts with the operational intent of the driver can be appropriately prevented.

Next, a second example embodiment of the invention will be described. In the following description, those portions that are the same as portions in the example embodiment described above will be denoted by the same reference characters and descriptions thereof will be omitted.

Second Example Embodiment

Figure 11:
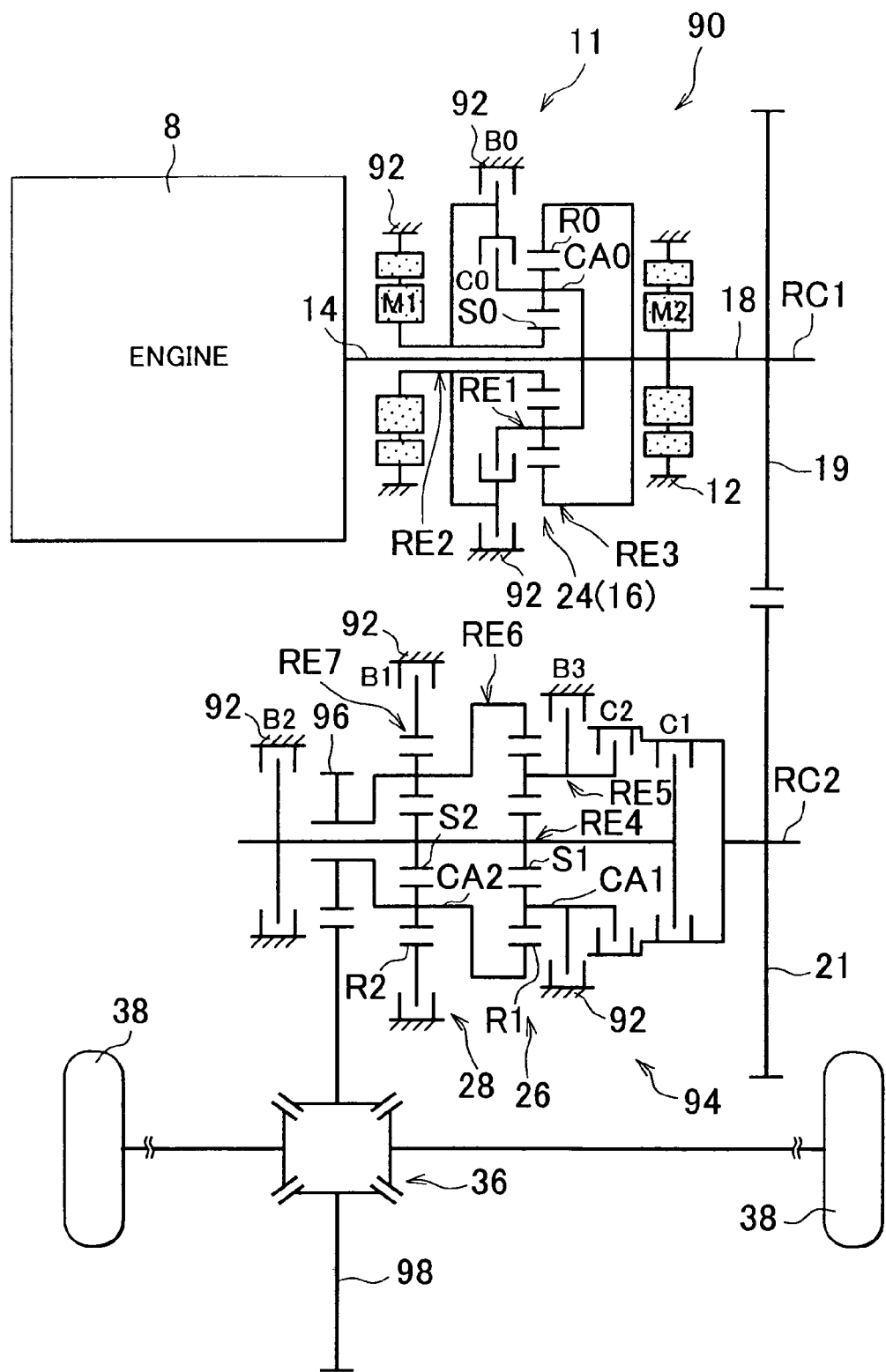
FIG. 11 is a skeleton view which corresponds to FIG. 1 and shows the structure of a shift mechanism of a hybrid vehicle according to a second example embodiment of the invention.
Figures 12, 13:
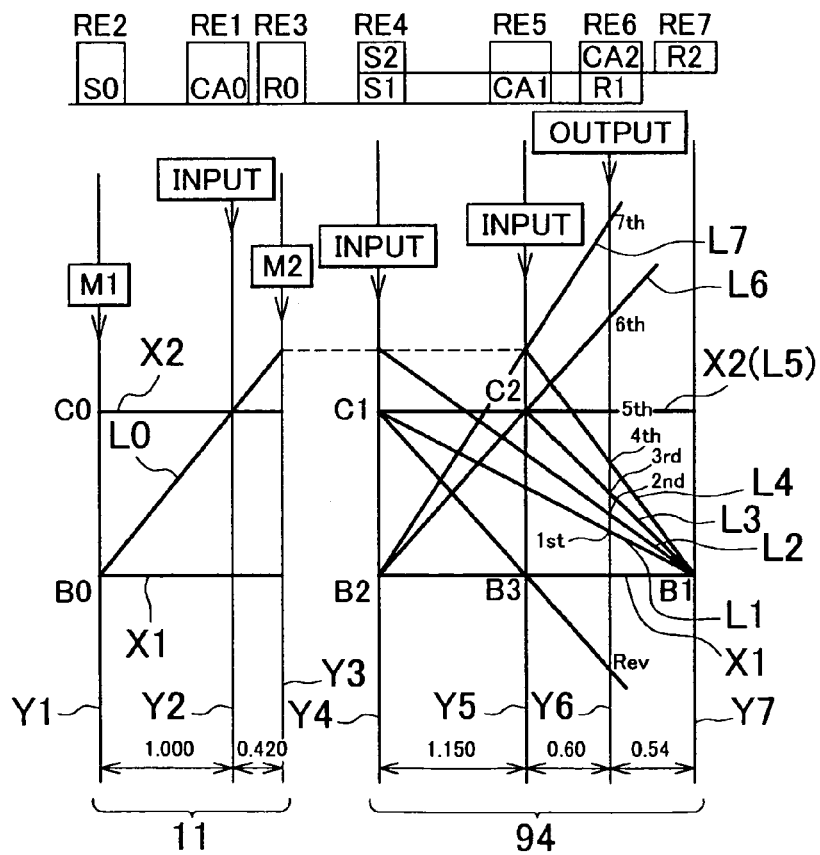
FIG. 12 is a clutch and brake application chart which corresponds to FIG. 2 and shows the gears in the stepped shift state of the shift mechanism according to the example embodiment shown in FIG. 11 together with the various application and release combinations of hydraulic friction apply devices (i.e., clutches and brakes) to achieve those gears.
FIG. 13 is an alignment graph which corresponds to FIG. 3 and illustrates the relative rotation speeds at each gear when the shift mechanism of the hybrid vehicle according to the second example embodiment shown in FIG. 11 is made to shift gears in a stepped manner.

FIG. 11 is a skeleton view showing the structure of a shift mechanism 90 according to a second example embodiment of the invention. FIG. 12 is a clutch and brake application chart showing various application and release combinations of clutches and brakes (i.e., hydraulic friction apply devices) to achieve specific gears when the shift mechanism 90 is in a stepped shift state. FIG. 13 is an alignment graph illustrating the shift operations of that shift mechanism 90.

The shift mechanism 90 has i) a differential portion 11 that includes a first electric motor M1, a power split device 16, and a second electric motor M2, just as in the foregoing first example embodiment, which are all provided on a first axis RC1, and ii) a forward four-speed automatic shifting portion 94 provided on a second axis RC2 that is parallel to the first axis RC1. The power split device 16 has a single pinion type planetary gear set 24 having a predetermined gear ratio $\rho 0$ of approximately 0.300, for example, as well as a switching clutch C0 and a switching brake B0. The automatic shifting portion 94 has a single pinion type first planetary gear set 26 that has a predetermined gear ratio $\rho 1$ of approximately 0.522, for example, as well as a single pinion type second planetary gear set 28 that has a predetermined gear ratio $\rho 2$ of approximately 0.309, for example. A first sun gear S1 of the first planetary gear set 26 and a second sun gear S2 of the second planetary gear set 28 are integrally connected together, and can be selectively connected to a transmitting member 18 via a first clutch C1 and a pair of counter driven gears, i.e., a counter drive gear 19 and a counter driven gear 21, that are in mesh with each other, as well as selectively connected to a case 92 via a second brake B2. A first carrier CA1 of the first planetary gear set 26 can also be selectively connected to the transmitting member 18 via a second clutch C2 and the pair of counter driven gears, i.e., the counter drive gear 19 and the counter driven gear 21, that are in mesh with each other, as well as selectively connected to the case 92 via a third brake B3. A first ring gear R1 of the first planetary gear set 26 and a second carrier CA2 of the second planetary gear set 28 are integrally connected together and connected to an output gear 96 which is an output member. A second ring gear R2 of the second planetary gear set 28 can be selectively connected to the case 92 via the first brake B1. The output gear 96 is in mesh with a differential drive gear 98 of a differential gear unit (final reduction device) 36 and transmits power to a pair of driving wheels 38 via that differential drive gear 98 and a pair of axles and the like, in that order. The counter drive gear 19 is provided on the first axis RC1 and the counter driven gear 21 is provided on the second axis RC2. The counter drive gear 19 and the counter driven gear 21 function as connecting devices that operatively link the transmitting member 18 with the first clutch C1 and the second clutch C2.

In the shift mechanism 90 structured as described above, any gear from first gear through seventh gear, reverse (i.e., reverse gear), or neutral may be selectively established by selectively applying the switching clutch C0, the first clutch C1, the second clutch C2, the switching brake B0, the first brake B1, the second brake B2, and the second brake B2 in the combinations shown in the clutch and brake application chart in FIG. 12. A total speed ratio $\gamma T$ (=the rotation speed NIN of the input shaft 14/the rotation speed NOUT of the output gear (output member) 96) that changes in substantially equal ratio can be obtained for each gear. In particular, in this example embodiment, the power split device 16 is provided with the switching clutch C0 and the switching brake B0. As a result, in addition to a continuously variable shift state in which it operates as a continuously variable transmission, the differential portion 11 can also be placed in a fixed shift state, in which it operates as a multi-speed transmission with fixed speed ratios, by applying either the switching clutch C0 or the switching brake B0. Therefore, the shift mechanism 90 can be placed in a stepped shift state in which it operates as a stepped transmission by the automatic shifting portion 94 and the differential portion 11 when the differential portion 11 is in the fixed shift state by applying either the switching clutch C0 or the switching brake B0, and can also be placed in a continuously variable shift state in which it operates as an electric continuously variable transmission by the automatic shifting portion 94 and the differential portion 11 when the differential portion 11 is placed in the continuously variable shift state by not applying the switching clutch C0 or the switching brake B0.

When the shift mechanism 90 functions as a stepped transmission, as shown the clutch and brake application chart in FIG. 12, first gear which has the largest speed ratio $\gamma T1$, e.g., approximately 4.241, can be established by applying the switching clutch C0, the first clutch C1, and the first brake B1. Second gear which has a speed ratio $\gamma T2$ smaller than that of first gear, e.g., approximately 2.986, can be established by applying the switching brake B0, the first clutch C1, and the first brake B1. Third gear which has a speed ratio $\gamma T3$ smaller than that of second gear, e.g., approximately 2.111, can be established by applying the switching clutch C0, the second clutch C2, the first brake B1. Fourth gear which has a speed ratio $\gamma T4$ smaller than that of third gear, e.g., approximately 1.482, can be established by applying the switching brake B0, the second clutch C2, and the first brake B1. Fifth gear which has a speed ratio $\gamma T5$ smaller than that of fourth gear, e.g., approximately 1.000, can be established by applying the switching clutch C0, the first clutch C1, and the second clutch C2. Sixth gear which has a speed ratio $\gamma T6$ smaller than that of fifth gear, e.g., approximately 0.657, can be established by applying the switching clutch C0, the second clutch C2, and the second brake B2. Seventh gear which has a speed ratio $\gamma T7$ smaller than that of sixth gear, e.g., approximately 0.463, can be established by applying the switching brake B0, the second clutch C2, and the second brake B2. Also, reverse which has a speed ratio $\gamma R$ between that of second gear and that of third gear, e.g., approximately 1.917, can be established by applying the first clutch C1 and the third brake B3 when driving using the engine 8 or by applying the first clutch C1 and the first brake B1 when driving using the second electric motor M2. Incidentally, when the shift mechanism 90 is in neutral "N", only the first clutch C1, for example, is applied.

However, when the shift mechanism 90 functions as a continuously variable transmission, both the switching clutch C0 and the switching brake B0 are released as shown in the clutch and brake application chart in FIG. 12. As a result, the differential portion 11 functions as a continuously variable transmission and the automatic shifting portion 94 that is connected in series with the differential portion 11 functions as a four-gear stepped transmission so the rotation speed, i.e., the rotation speed of the transmitting member 18, that is input to the automatic shifting portion 94 for each of the four gears, i.e., first gear, second gear, third gear, and fourth gear, of the automatic shifting portion 94 can be changed continuously such that each gear has a continuous speed ratio width. Accordingly, there is a continuously variable gear ratio between each gear, thereby enabling the total speed ratio γT of the overall shift mechanism 90 to be obtained in a continuous (i.e., stepless) manner.

FIG. 13 is an alignment graph that shows the correlative relationships among the rotation speeds of the various rotating members in different connective states for each gear, in the shift mechanism 90 that is made up of the differential portion 11 that functions as a continuously variable shifting portion or a first transmitting portion and the automatic shifting portion that functions as a stepped shifting portion or a second transmitting portion. The rotation speed of each element in the power split device 16 when both the switching clutch C0 and the switching brake B0 are released, as well as when either the switching clutch C0 or the switching brake B0 is applied is the same as is described above.

The four vertical lines Y4, Y5, Y6, and Y7 of the automatic shifting portion 94 in FIG. 13 represent, in order from left to right, the first sun gear S1 and the second sun gear S2 which are connected together and correspond to a fourth rotating element (fourth element) RE4, the first carrier CA1 corresponding to a fifth rotating element (fifth element) RE5, the second carrier CA2 and the first ring gear R1 which are connected together and correspond to a sixth rotating element (sixth element) RE6, and the second ring gear R2 corresponding to a seventh rotating element (seventh element) RE7. Also, in the automatic shifting portion 94, the fourth rotating element RE4 can be selectively connected to the transmitting member 18 via the first clutch C1 as well as selectively connected to the case 92 via the second brake B2, the fifth rotating element RE5 is selectively connected to the transmitting member 18 via the second clutch C2 as well as selectively connected to the case via the third brake B3, the sixth rotating element is connected to the output gear 96 of the automatic shifting portion 94, and the seventh rotating element RE7 can be selectively connected to the case 92 via the first brake B1.

As shown in FIG. 13, in the automatic shifting portion 94, the rotation speed of the output gear 96 in first gear, which is established by applying the switching clutch C0, the first clutch C1, and the first brake B1, is shown at the point of intersection of i) the sloped straight line L1 that passes through both a) the point of intersection of the horizontal line X1 and the vertical line Y7 that represents the rotation speed of the seventh rotating element RE7 (R2) and b) the point of intersection of the horizontal line X2 and the vertical line Y4 that represents the rotation speed of the fourth rotating element RE4 (S1 and S2), and ii) the vertical line Y6 that represents the rotation speed of the sixth rotating element RE6 (R1 and CA2) that is connected to the output gear 96. Similarly, the rotation speed of the output gear 96 in second gear, which is established by applying the switching brake B0, the first clutch C1, and the first brake B1, is shown at the point of intersection of the sloped straight line L2 and the vertical line Y6 that represents the rotation speed of the sixth rotating element RE6 that is connected to the output gear 96. Also, the rotation speed of the output gear 96 in third gear, which is established by applying the switching clutch C0, the second clutch C2, and the first brake B1, is shown at the point of intersection of the sloped straight line l3 and the vertical line Y6 that represents the rotation speed of the sixth rotating element RE6 that is connected to the output gear 96. Similarly, the rotation speed of the output gear 96 in fourth gear, which is established by applying the switching clutch C0, the second clutch C2, and the first brake B1, is shown at the point of intersection of the sloped straight line L4 and the vertical line Y6 that represents the rotation speed of the sixth rotating element RE6 that is connected to the output gear 96. Also, the rotation speed of the output gear 96 in fifth gear, which is established by applying the switching clutch C0, the first clutch C1, and the second clutch C2, is shown at the point of intersection of the sloped straight line L5 and the vertical line Y6 that represents the rotation speed of the sixth rotating element RE6 that is connected to the output gear 96. Similarly, the rotation speed of the output gear 96 in sixth gear, which is established by applying the switching clutch C0, the second clutch C2, and the second brake B2, is shown at the point of intersection of the sloped straight line L6 and the vertical line Y6 that represents the rotation speed of the sixth rotating element RE6 that is connected to the output gear 96. Similarly, the rotation speed of the output gear 96 in seventh gear, which is established by applying the switching brake B0, the second clutch C2, and the second brake B2, is shown at the point of intersection of the sloped straight line L7 and the vertical line Y6 that represents the rotation speed of the sixth rotating element RE6 that is connected to the output gear 96.

The shift mechanism 90 of this example embodiment is also controlled into one of seven forward gears in order to achieve a wide speed ratio width and a close ratio as shown in FIG. 12. Therefore, as described above, the shift between second gear and third gear and the shift between fourth gear and fifth gear are defined as simultaneous shifts in this example embodiment because in these shifts a downshift in one of the differential portion 11 and the automatic shifting portion 94 is simultaneously executed with an upshift in the other. However, the engine speed NE increases from the downshift in one and simultaneously decreases from the upshift in the other, so in this case. Therefore, even a slight difference in timing would result in an increase or decrease in engine speed which may be felt as shift shock by the occupants, which is undesirable.

However, the shift mechanism 90 in this example embodiment as well includes the differential portion 11 that functions as a continuously variable shifting portion or a first transmitting portion, and the automatic shifting portion 94 that functions as a stepped shifting portion or a second transmitting portion. A shift in the first transmitting portion is executed in sync with a shift in the second transmitting portion during a synchronous shift in which a downshift in one of the differential portion 11 and the automatic shifting portion 94 and an upshift in the other are executed simultaneously, so the same effects as those obtained with the first example embodiment can be obtained.

Also, according to this example embodiment, the power split device 16 and the automatic shifting portion 94 are not arranged on the same axis as the power split device 16 and the automatic shifting portion 20 are in the shift mechanism shown in FIG. 1 so the dimensions of the shift mechanism 90 in the axial direction can be shortened. Accordingly, the shift mechanism 90 may be used as a transverse mountable shift mechanism, i.e., a shift mechanism in which the first axis RC1 and the second axis RC2 can be mounted horizontal with the vehicle width direction, for a FF vehicle or a RR vehicle in which the axial dimensions of the shift mechanism are typically limited by the vehicle width. Also, the power split device 16 and the automatic shifting portion 94 are arranged between the engine 8 (the differential drive gear 32) and the counter gear set CG so the axial dimensions of the shift mechanism 90 can be made even shorter. Furthermore, the second electric motor M2 is arranged on the first axis RC1 so the axial dimensions of the second axis RC2 are shorter.

While example embodiments of the invention have been described in detail with reference to the drawings, the invention is not limited to these example embodiments or constructions.

For example, in the shift mechanisms 10 and 90 in the foregoing example embodiments, the shift between second gear and third gear, and the shift between fourth gear and fifth gear are simultaneous shifts in which a downshift in one of i) the differential portion 11 and ii) the automatic shifting portion 20 or the automatic shifting portion 94 is executed simultaneously with an upshift in the other. However, the simultaneous shift is not limited to the shift between second gear and third gear and the shift between fourth gear and fifth gear.

Figure 14:
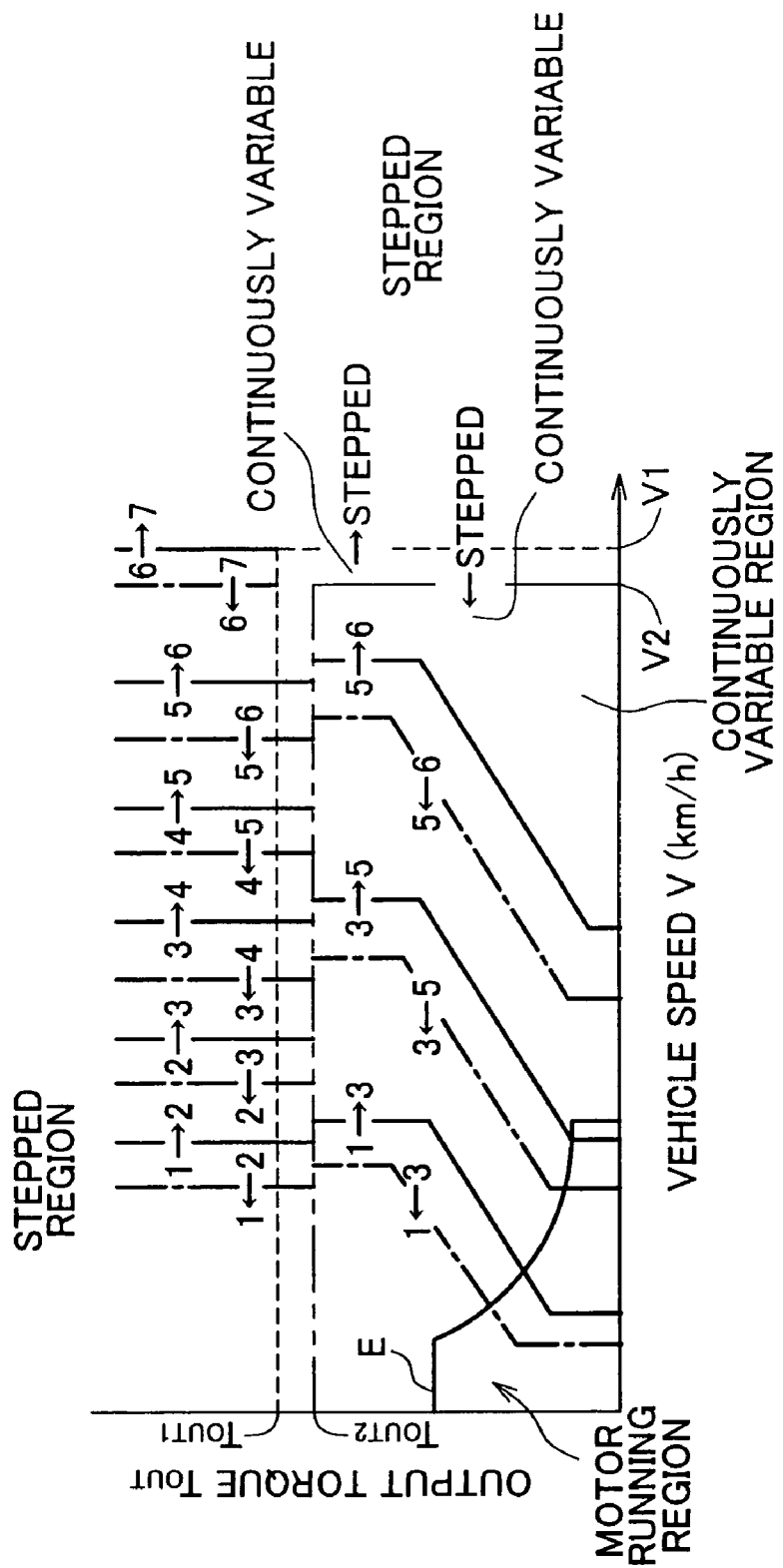
FIG. 14 is a view which corresponds to FIG. 6 and shows another mode of the shift line graph which is used for making shift determinations, and another mode of the switching line graph which is used for making switching determinations regarding the shift state of the shift mechanism.

Also, in the foregoing example embodiments, the shift line graph and the switching line graph are such that the stepped shift line and the continuously variable shift line are continuous via across the switching line, as shown in FIG. 6. However, the invention is not limited to this. For example, the stepped shift line and the continuously variable shift line may also be discontinuous at the switching line as shown in FIG. 14.

Also, in the foregoing example embodiments, the forward four-gear automatic shifting portions 20 and 94 function as second transmitting portions. However, they are not limited to this as long as they have at least two forward gears and execute a simultaneous shift by a downshift in one of i) the differential portion 11 and ii) the automatic shifting portion 20 or the automatic shifting portion 94 being executed simultaneously with an upshift in the other.

Also, in the power split device 16 in the foregoing example embodiments, the carrier CA0 is connected to the engine 8, the sun gear S0 is connected to the first electric motor M1, and the ring gear R0 is connected to the transmitting member 18. However, the connective relationships are not necessarily limited to these. For example, the engine 8, the first electric motor M1, and the transmitting member 18 may be connected to any of the three elements CA0, S0, and R0 of the planetary gear set 24.

Also, in the foregoing example embodiments, the engine 8 is directly connected to the input shaft 14. Alternatively, for example, the engine 8 may be operatively linked to the input shaft 14 via a gear, a transmission chain or a transmission belt or the like, and therefore the two do not necessarily have to be arranged on the same axis. Also, a pair of sprockets around which a transmission chain is wound may be provided instead of the counter drive gear 16 and the counter driven gear 21 in the example embodiment shown in FIG. 11.

Also in the foregoing example embodiments, the hydraulic friction apply devices such as the switching clutch C0 and the switching brake B0 may be magnetic-particle type apply devices such as powder (magnetic particle) clutches, electromagnetic type apply devices such as electromagnetic clutches, or mechanical type apply devices such as mesh type dog clutches or the like.

Also, in the foregoing example embodiments, the second electric motor M2 is connected to the transmitting member 18. Alternatively, however, the second electric motor M2 may be connected to the output shaft 22 or to a rotating member inside the automatic shifting portion 20 or 94.

Also, the power split device 16, which serves as the differential mechanism in the foregoing example embodiments, may also be a differential gear unit in which a pinion which is rotatably driven by the engine and a pair of umbrella gears that are in mesh with that pinion are operatively linked to the first electric motor M1 and the second electric motor M2, for example.

Also, the power split device 16 in the foregoing example embodiment is made up of a single planetary gear set, but it may also be made up of two or more planetary gear sets such that when it is in the non-differential state (i.e., a fixed shift state) it functions as a transmission with three or more gears.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. A control apparatus for a vehicular power transmitting apparatus that includes, in series,
   i) a differential portion which is provided with a differential mechanism having a differential function with respect to an input shaft and an output shaft, in which the differential mechanism is switched between a differential state and a non-differential state, and
   ii) a stepped shifting portion that shifts between a plurality of gears in a stepped manner, wherein during a shift with a switch between the differential state and the non-differential state in the differential portion, the control apparatus maintains a current gear at that time or shifts into a gear that is adjacent to the current gear; wherein
   the differential portion switches between a plurality of the non-differential states, each of which has a different speed ratio; and
   a shift point vehicle speed for changing the total speed ratio by the switch between different non-differential states in the differential portion and the shift in the stepped shifting portion being executed simultaneously is set within a vehicle speed range that is set such that a vehicle runs using a combination of the stepped shifting portion that uses a same gear as a higher gear, from among the gear before the shift in the stepped shifting portion and the gear after the shift in the stepped shifting portion, and the differential portion that has been placed in the differential state.

2. The control apparatus according to claim 1, wherein the vehicular power transmitting apparatus, when the differential portion has been placed in a non-differential state selected from among the plurality of non-differential states, operates as a stepped transmission in which a plurality of various total speed ratios of the vehicular power transmitting apparatus are selectively established based on a speed ratio of the gear set by the stepped shifting portion and a speed ratio of the differential portion in the non-differential state; and
   the control apparatus executes a shift in which the total speed ratio is changed by the switch between the plurality of non-differential states in the differential portion and the shift in the stepped shifting portion being executed simultaneously.

3. The control apparatus according to claim 1, wherein the control apparatus maintains the same gear in the stepped shifting portion regardless of a switch between the differential state and the non-differential state in the differential portion when a command has been output to the vehicular power transmitting apparatus to change one of output and output torque.

4. The control apparatus according to claim 1, wherein the control apparatus switches the differential portion between the differential state and the non-differential state, or simultaneously executes a shift in the stepped shifting portion and switches the differential portion between the differential state and the non-differential state, so that the speed of an engine that supplies driving force to a vehicle via the vehicular power transmitting apparatus does not decrease when a command to increase one of output and output torque has been output to the vehicular power transmitting apparatus.

5. The control apparatus according to claim 1, wherein the control apparatus switches the differential portion between the differential state and the non-differential state, or simultaneously executes a shift in the stepped shifting portion and switches the differential portion between the differential state and the non-differential state, so that the speed of an engine that supplies driving force to a vehicle via the vehicular power transmitting apparatus does not increase when a command to reduce one of output and output torque has been output to the vehicular power transmitting apparatus.

6. The control apparatus according to claim 1, wherein
the differential portion operates as an electric continuously variable transmission that controls the differential state of the input shaft rotation speed and the output shaft rotation speed by the operating state of an electric motor that is connected to a rotating element of the differential mechanism being controlled when the differential portion is in the differential state; and
the vehicular power transmitting apparatus operates as a continuously variable transmission that continuously changes the total speed ratio using the stepped shifting portion and the differential portion which has been placed in the differential state in combination.

7. The control apparatus according to claim 1, wherein the control apparatus further includes
  i) a first control map in which a differential region that places the differential portion in the differential state and a non-differential region that places the differential portion in the non-differential state are determined by a switching line according to a predetermined control parameter, and which is used for switching control to switch the differential portion between the differential state and the non-differential state,
  ii) a second control map in which a continuously variable shift line that specifies a change of the gear of the stepped shifting portion is determined by the same control parameter as the control parameter in the first control map, and which is used in shift control of the vehicular power transmitting apparatus when the differential portion is in the differential state, and
  iii) a third control map in which a stepped shift line that specifies a switch between the plurality of non-differential states in the differential portion and/or a change of the gear of the stepped shifting portion, is determined by the same control parameter as the control parameter in the first control map, and which is used in shift control of the vehicular power transmitting apparatus; and
when the first control map, the second control map, and the third control map are superposed on one another, the control apparatus makes the gear of the stepped shifting portion that is used in a predetermined continuously variable gear region which is defined by being sandwiched between a pair of continuously variable shift lines in the differential region and the switching line, either the same as the gear of the stepped shifting portion that is used in a predetermined stepped gear region which is defined by being sandwiched between a pair of stepped shift lines in the non-differential region and the switching line, or a gear that is adjacent to the gear of the stepped shifting portion that is used in the predetermined stepped gear region which is defined by being sandwiched between the pair of stepped shift lines in the non-differential region and the switching line.

8. The control apparatus according to claim 7, wherein the stepped shift line in the third control map includes a portion for executing the switch between the plurality of non-differential states and the shift in the stepped shifting portion substantially simultaneously.

9. The control apparatus according to claim 7, wherein the point of intersection of a switching line in the first control map and a stepped shift line that is associated with both a shift in the stepped shifting portion and a switch among the plurality of non-differential states in the differential portion, from among the plurality of stepped shift lines in the third control map, is positioned between
  i) a point of intersection of a switching line in the first control map and a first continuously variable shift line that represents a shift between
    a) a predetermined gear which is the higher gear, from among the gear before the shift in the stepped shifting portion and the gear after the shift in the stepped shifting portion, according to the stepped shift line with both the shift in the stepped shifting portion and the switch among the plurality of non-differential states in the differential portion, among the plurality of continuously variable shift lines in the second map, and
    b) a gear that is adjacent to, on the lower gear side of, that predetermined gear, and
  ii) a point of intersection of a switching line in the first control map and a second continuously variable shift line that represents a shift between the predetermined gear and a gear that is adjacent to, on the higher gear side of, that predetermined gear.

10. The control apparatus according to claim 7, wherein the continuously variable shift line in the second control map determines only the gear of the stepped shifting portion.

11. The control apparatus according to claim 7, wherein when the first control map, the second control map, and the third control map are superposed on one another, the gear used in the stepped shifting portion in the continuously variable gear region is either the same as the gear used in the stepped shifting portion in a predetermined stepped gear region that is contacting the continuously variable gear region via the switching line, or a gear that is adjacent to the gear used in the stepped shifting portion in the predetermined stepped gear region that is contacting the continuously variable gear region via the switching line.

12. The control apparatus according to claim 1, wherein the control apparatus makes
  a) the order of gears into which the stepped shifting portion is shifted as the vehicle gear changes when the differential portion is in the non-differential state, and
  b) the order of gears into which the stepped shifting portion is shifted as the vehicle speed changes when the differential portion is in the differential state, the same.

13. A control method for a vehicular power transmitting apparatus that includes, in series,
  i) a differential portion which is provided with a differential mechanism having a differential function with respect to an input shaft and an output shaft, in which the differential mechanism is switched between a differential state and a non-differential state, and
  ii) a stepped shifting portion that shifts between a plurality of gears in a stepped manner, the control method comprising:

maintaining, during a shift with a switch between the differential state and the non-differential state in the differential portion, the gear at the time or shifting into a gear that is adjacent to that gear, wherein the differential portion switches between a plurality of the non-differential states, each of which has a different speed ratio; and a shift point vehicle speed for changing the total speed ratio by the switch between different non-differential states in the differential portion and the shift in the stepped shifting portion being executed simultaneously is set within a vehicle speed range that is set such that a vehicle runs using a combination of the stepped shifting portion that uses the same gear as the higher gear, from among the gear before the shift in the stepped shifting portion and the gear after the shift in the stepped shifting portion, and the differential portion that has been placed in the differential state.

14. The control method according to claim 13, wherein the vehicular power transmitting apparatus, when the differential portion has been placed in a non-differential state selected from among the plurality of non-differential states, operates as a stepped transmission in which a plurality of various total speed ratios of the vehicular power transmitting apparatus are selectively established based on a speed ratio of the gear set by the stepped shifting portion and a speed ratio of the differential portion in the non-differential state, the control method further comprising:

executing a shift in which the total speed ratio is changed by the switch between the plurality of non-differential states in the differential portion and the shift in the stepped shifting portion being executed simultaneously.

15. The control method according to claim 13, further comprising:

maintaining the same gear in the stepped shifting portion regardless of a switch between the differential state and the non-differential state in the differential portion when a command has been output to the vehicular power transmitting apparatus to change one of output and output torque.

16. The control method according to claim 13, further comprising:

switching the differential portion between the differential state and the non-differential state, or simultaneously executes a shift in the stepped shifting portion and switching the differential portion between the differential state and the non-differential state, so that the speed of an engine that supplies driving force to a vehicle via the vehicular power transmitting apparatus does not decrease when a command to increase one of output and output torque has been output to the vehicular power transmitting apparatus.

17. The control method according to claim 13, further comprising:

switching the differential portion between the differential state and the non-differential state, or simultaneously executes a shift in the stepped shifting portion and switching the differential portion between the differential state and the non-differential state, so that the speed of an engine that supplies driving force to a vehicle via the vehicular power transmitting apparatus does not increase when a command to reduce one of output and output torque has been output to the vehicular power transmitting apparatus.

18. The control method according to claim 13, wherein the differential portion operates as an electric continuously variable transmission that controls the differential state of the input shaft rotation speed and the output shaft rotation speed by the operating state of an electric motor that is connected to a rotating element of the differential mechanism being controlled when the differential portion is in the differential state; and the vehicular power transmitting apparatus operates as a continuously variable transmission that continuously changes the total speed ratio using the stepped shifting portion and the differential portion which has been placed in the differential state in combination.

19. The control method according to claim 13, further having i) a first control map in which a differential region that places the differential portion in the differential state and a non-differential region that places the differential portion in the non-differential state are determined by a switching line according to a predetermined control parameter, and which is used for switching control to switch the differential portion between the differential state and the non-differential state, ii) a second control map in which a continuously variable shift line that specifies a change of the gear of the stepped shifting portion is determined by the same control parameter as the control parameter in the first control map, and which is used in shift control of the vehicular power transmitting apparatus when the differential portion is in the differential state, and iii) a third control map in which a stepped shift line that specifies a switch between the plurality of non-differential states in the differential portion and/or a change of the gear of the stepped shifting portion, is determined by the same control parameter as the control parameter in the first control map, and which is used in shift control of the vehicular power transmitting apparatus, the control method comprising:

making, when the first control map, the second control map, and the third control map are superposed on one another, the gear of the stepped shifting portion that is used in a predetermined continuously variable gear region which is defined by being sandwiched between a pair of continuously variable shift lines in the differential region and the switching line, either the same as the gear of the stepped shifting portion that is used in a predetermined stepped gear region which is defined by being sandwiched between a pair of stepped shift lines in the non-differential region and the switching line, or a gear that is adjacent to the gear of the stepped shifting portion that is used in the predetermined stepped gear region which is defined by being sandwiched between the pair of stepped shift lines in the non-differential region and the switching line.

20. The control method according to claim 19, wherein the stepped shift line in the third control map includes a portion for executing the switch between the plurality of non-differential states and the shift in the stepped shifting portion substantially simultaneously.

21. The control method according to claim 19, wherein the point of intersection of a switching line in the first control map and a stepped shift line that is associated with both a shift in the stepped shifting portion and a switch among the plurality of non-differential states in the differential portion, from among the plurality of stepped shift lines in the third control map, is positioned between i) a point of intersection of a switching line in the first control map and a first continuously variable shift line that represents a shift between a) a predetermined gear which is the higher gear, from among the gear before the shift in the stepped shifting portion and the gear after the shift in the stepped shifting portion, according to the stepped shift line with both the shift in the stepped shifting portion and the switch among the plurality of non-differential states in the differential portion, among the plurality of continuously variable shift lines in the second map, and
  b) a gear that is adjacent to, on the lower gear side of, that predetermined gear, and
 ii) a point of intersection of a switching line in the first control map and a second continuously variable shift line that represents a shift between the predetermined gear and a gear that is adjacent to, on the higher gear side of, that predetermined gear.

22. The control method according to claim 19, wherein the continuously variable shift line in the second control map determines only the gear of the stepped shifting portion.

23. The control method according to claim 19, wherein when the first control map, the second control map, and the third control map are superposed on one another, the gear used in the stepped shifting portion in the continuously variable gear region is either the same as the gear used in the stepped shifting portion in a predetermined stepped gear region that is contacting the continuously variable gear region via the switching line, or a gear that is adjacent to the gear used in the stepped shifting portion in the predetermined stepped gear region that is contacting the continuously variable gear region via the switching line.

24. The control method according to claim 13, further comprising:
   making
   a) the order of gears into which the stepped shifting portion is shifted as the vehicle gear changes when the differential portion is in the non-differential state, and
   b) the order of gears into which the stepped shifting portion is shifted as the vehicle speed changes when the differential portion is in the differential state, the same.

* * * * *